(12) United States Patent
Fursa et al.

(10) Patent No.: US 11,212,881 B2
(45) Date of Patent: Dec. 28, 2021

(54) INDUCTIVE HEATING DEVICE, AEROSOL-GENERATING SYSTEM COMPRISING AN INDUCTIVE HEATING DEVICE AND METHOD OF OPERATING THE SAME

(71) Applicant: Philip Morris Products S.A., Neuchatel (CH)

(72) Inventors: Oleg Fursa, Gempenach (CH); Oleg Mironov, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 456 days.

(21) Appl. No.: 16/339,090

(22) PCT Filed: Nov. 22, 2017

(86) PCT No.: PCT/EP2017/080127
§ 371 (c)(1),
(2) Date: Apr. 3, 2019

(87) PCT Pub. No.: WO2018/096000
PCT Pub. Date: May 31, 2018

(65) Prior Publication Data
US 2020/0037664 A1 Feb. 6, 2020

(30) Foreign Application Priority Data

Nov. 22, 2016 (EP) .................................... 16200121

(51) Int. Cl.
*A24F 47/00* (2020.01)
*H05B 6/10* (2006.01)
(Continued)

(52) U.S. Cl.
CPC ........... *H05B 6/105* (2013.01); *A24F 40/465* (2020.01); *A24F 40/50* (2020.01); *A24F 40/57* (2020.01); *A24F 40/20* (2020.01); *H02M 7/42* (2013.01)

(58) Field of Classification Search
CPC ........ A24F 40/20; A24F 40/465; A24F 40/53; H05B 1/0244; H05B 6/105; H05B 2203/021
See application file for complete search history.

(56) References Cited

U.S. PATENT DOCUMENTS 5,613,505 A 3/1997 Campbell et al.
9,713,345 B2 * 7/2017 Farine ................ G05D 23/1919
(Continued)

FOREIGN PATENT DOCUMENTS

CN 204292204 U 4/2015
RU 2 517 125 C2 5/2014
(Continued)

OTHER PUBLICATIONS

International Search Report and Written Opinion dated Mar. 13, 2018, in PCT/EP2017/080127 filed on Nov. 22, 2017.
(Continued)

*Primary Examiner* — Robert J Utama
*Assistant Examiner* — Lawrence H Samuels
(74) *Attorney, Agent, or Firm* — Oblon, McClelland, Maier & Neustadt, L.L.P.

(57) ABSTRACT

There is provided an inductive heating device configured to receive an aerosol-generating article including an aerosol-forming substrate and a susceptor, and to heat the susceptor when the article is received by the device, the device including a DC power supply to provide a DC supply voltage and a DC current; and power supply electronics including a DC/AC converter connected to the power sup-
(Continued)

ply, and an inductor connected to the converter to inductively couple to the susceptor when the article is received by the device, the electronics being configured to supply power to the inductor from the power supply, via the converter, for heating the susceptor when the article is received by the device, the supplied power being provided in a plurality of pulses separated by time intervals, and to control a duration of the time intervals between successive pulses based on measurements of the current provided by the power supply.

13 Claims, 6 Drawing Sheets

(51) Int. Cl.
    *H05B 6/06*           (2006.01)
    *A24F 40/465*       (2020.01)
    *A24F 40/50*         (2020.01)
    *A24F 40/57*         (2020.01)
    *H02M 7/42*          (2006.01)
    *A24F 40/20*         (2020.01)

(56) References Cited

U.S. PATENT DOCUMENTS

| | | | |
|---|---|---|---|
| 10,028,533 B2 * | 7/2018 | Fursa | A24F 40/53 |
| 10,051,890 B2 * | 8/2018 | Mironov | A24F 40/50 |
| 10,945,466 B2 * | 3/2021 | Mironov | A24D 1/20 |
| 2015/0060437 A1 | 3/2015 | Karch et al. | |
| 2015/0237916 A1 * | 8/2015 | Farine | H05B 1/0225 219/492 |
| 2016/0150825 A1 | 6/2016 | Mironov et al. | |
| 2016/0331038 A1 | 11/2016 | Farine et al. | |
| 2017/0055585 A1 * | 3/2017 | Fursa | H05B 6/36 |
| 2017/0055587 A1 | 3/2017 | Zinovik et al. | |
| 2017/0172208 A1 | 6/2017 | Mironov | |

FOREIGN PATENT DOCUMENTS

| | | |
|---|---|---|
| WO | WO 95/27411 A1 | 10/1995 |
| WO | WO 2014/040988 A2 | 3/2014 |
| WO | WO 2015/177255 A1 | 11/2015 |
| WO | WO 2015/177256 A1 | 11/2015 |
| WO | WO 2015/177257 A1 | 11/2015 |
| WO | WO 2015/177294 A1 | 11/2015 |

OTHER PUBLICATIONS

Combine Russian Federation Office Action and Search Report dated Mar. 10, 2021 in Russian Federation Patent Application No. 2019115679/03(029864) (with English translation), 25 pages.

* cited by examiner

INDUCTIVE HEATING DEVICE, AEROSOL-GENERATING SYSTEM COMPRISING AN INDUCTIVE HEATING DEVICE AND METHOD OF OPERATING THE SAME

TECHNICAL FIELD

The present invention relates to an inductive heating device for heating an aerosol-forming substrate. The present invention also relates to an aerosol-generating system comprising such an inductive heating device. The present invention further relates to a method of operating such aerosol-generating system.

BACKGROUND

Electrically operated aerosol-generating systems comprising an aerosol-generating article having an aerosol-forming substrate and an electrically operated heat source that is configured to heat the aerosol-forming substrate are known in the art. Such systems typically generate an aerosol by transferring heat from the heat source to the aerosol-forming substrate, which releases volatile compounds from the aerosol-forming substrate that become entrained in air drawn through the aerosol-generating article, cool and condense to form an aerosol that may be inhaled by a user.

Some electrically operated aerosol-generating system comprise an inductive heating device or an electrically operated aerosol-generating device having an induction source. Inductive heating devices typically comprise an induction source that is configured to be coupled to a susceptor. The induction source generates an alternating electromagnetic field that induces eddy currents in the susceptor. The induced eddy currents heat the susceptor through ohmic or resistive heating. The susceptor is further heated as a result of hysteresis losses.

Electrically operated aerosol-generating systems comprising an inductive heating device typically also comprise an aerosol-generating article having an aerosol-forming substrate and a susceptor in thermal proximity to the aerosol-forming substrate. In these systems, the induction source generates an alternating electromagnetic field that induces eddy currents in the susceptor. The induced eddy currents heat the susceptor, which in turn heats the aerosol-forming substrate. Typically, the susceptor is in direct contact with the aerosol-forming substrate and heat is transferred from the susceptor to the aerosol-forming substrate primarily by conduction. Examples of electrically operated aerosol-generating systems having inductive heating devices and aerosol-generating articles having susceptors are described in WO-A1-95/27411 and WO-A1-2015/177255.

One aim of electrically operated aerosol-generating systems is to reduce known harmful by-products of combustion and pyrolytic degradation of some aerosol-forming substrates. As such, it is desirable for these systems to monitor the temperature of the aerosol-forming substrate to ensure that the aerosol-forming substrate is not heated to a temperature at which the aerosol-forming substrate may combust.

In aerosol-generating articles having a susceptor that is in direct contact with the aerosol-forming substrate, it may be assumed that the temperature of the susceptor is representative of the temperature of the aerosol-forming substrate. Using this assumption, the temperature of the aerosol-forming substrate may be monitored by monitoring the temperature of the susceptor.

Typically, a susceptor in an aerosol-generating article that is coupled to an inductive heating device is not directly physically connected to circuitry in the inductive heating device. As a result, it is not possible for the inductive heating device to directly monitor electrical quantities of the susceptor, such as the electrical resistance, and calculate the temperature of the susceptor from known relationships between electrical quantities and temperature.

However, there are some prior art proposals for determining the temperature of a susceptor without direct measurement of electrical quantities of the susceptor. For example, in WO-A1-2015/177255, WO-A1-2015/177256 and WO-A1-2015/177257 an electrically operated aerosol-generating system is proposed that comprises a device having a DC power supply and an inductor and circuitry configured to measure the DC voltage and DC current across the DC power supply to determine an apparent resistance of a susceptor coupled to the inductor. As described in the above mentioned documents, surprisingly, it has been found that the apparent resistance of a susceptor may vary with the temperature of the susceptor in a strictly monotonic relationship over certain ranges of temperature of the susceptor. The strictly monotonic relationship allows for an unambiguous determination of the temperature of the susceptor from a determination of the apparent resistance. This is because each determined value of the apparent resistance is representative of only one single value of the temperature, there is no ambiguity in the relationship. The monotonic relationship of the temperature of the susceptor and the apparent resistance allows for the determination and control of the temperature of the susceptor and thus for the determination and control of the temperature of the aerosol-forming substrate.

There exists an opportunity to improve the determination and control of the temperature of an aerosol-forming substrate in an electrically operated aerosol-generating system having an inductive heating device. In particular, there exists an opportunity to improve the interaction between an inductive heating device and an aerosol-generating article having a susceptor.

It would be desirable to provide a temperature monitoring and control function in an electrically operated aerosol-generating system comprising an inductive heating device and an aerosol-generating article having a susceptor that is straightforward to implement, reliable and inexpensive. It would also be desirable to provide a puff detection function in an aerosol-generating device comprising inductive heating means that is straightforward to implement, reliable and inexpensive.

STATEMENT OF INVENTION

According to a first aspect of the present invention, there is provided an inductive heating device configured to receive an aerosol-generating article comprising an aerosol-forming substrate and a susceptor in thermal proximity to the aerosol-forming substrate, the inductive heating device being configured to heat the susceptor when the aerosol-generating article is received by the inductive heating device, the inductive heating device comprising: a DC power supply for providing a DC supply voltage and a DC current; and power supply electronics. The power supply electronics comprise: a DC/AC converter connected to the DC power supply; and an inductor connected to the DC/AC converter and arranged to inductively couple to a susceptor of an aerosol-generating article when an aerosol-generating article is received by the inductive heating device. The power supply electronics are configured to: supply power to the inductor from the DC power supply, via the DC/AC converter, for heating the susceptor of the aerosol-generating article when the aerosol-generating article is received by the inductive heating device, the supply of power being provided in a plurality of pulses separated by time intervals; and control the duration of the time interval between successive pulses based on measurements of the DC current supplied by the DC power supply.

Supplying power from the DC power supply to the inductor in a plurality of pulses, separated by time intervals, enables the power supply electronics of the inductive heating device to provide fine control to the heating of a susceptor and aerosol-forming substrate in an aerosol-generating article received by the inductive heating device.

During each pulse of power supplied from the DC power supply to the inductor, the inductor generates an AC electromagnetic field that induces eddy currents in a susceptor of an aerosol-generating article coupled to the inductor. The eddy currents in the susceptor heat the susceptor, which in turn heats the aerosol-forming substrate of the article.

During the time intervals between successive pulses of power from the DC power supply, the supply of power from the DC power supply to the inductor is interrupted. As such, the inductor does not generate an AC electromagnetic field or generates an AC electromagnetic field with a reduced field strength. Thus, during the time intervals between successive pulses of power from the DC power supply, the susceptor is not heated or is heated less by induced eddy currents and is provided with an opportunity to cool.

The term 'interrupt' is used herein to cover embodiments in which the supply of DC power from the DC power supply is stopped or reduced such that effectively no alternating electromagnetic field is generated by the inductor. Similarly, the term 'resume' is used herein to cover embodiments in which the supply of power from the DC power supply is started or increased such that an alternating electromagnetic field is generated by the inductor that is sufficient to cause heating of a susceptor coupled to the inductor.

The power supply electronics of the inductive heating device of the present invention are configured to control the duration of the time interval between successive pulses. As such, the power supply electronics are configured to control the duration of the time period that the susceptor is allowed to cool between pulses.

Controlling the duration of the time periods between successive pulses may provide several advantages over the prior art devices, which will be described in detail below.

The power supply electronics are particularly configured to control the duration of the time intervals between successive pulses of power from the DC power supply based on the DC current supplied by the power supply. As explained in the prior art documents mentioned above, the DC current supplied by the DC power supply has been found to relate to the temperature and the apparent resistance of a susceptor coupled to the inductor. Thus, the power supply electronics of the present invention are configured to control the duration of the time intervals between successive pulses of power supplied by the DC power supply based indirectly on the temperature of a susceptor coupled to the inductor.

By controlling the duration of the time intervals in between successive pulses of power from the DC power supply to the inductor based on the temperature of the susceptor, the inductive heating device of the present invention may compensate for temperature fluctuations in a susceptor of an aerosol-generating article coupled to the inductor during a heating cycle. For example, the inductive heating device of the present invention may be configured to increase the duration of the time intervals between successive pulses if the temperature of the susceptor coupled to the inductor is determined to reach or be raised above a maximum threshold and may be configured to reduce the duration of the time intervals between successive pulses if the temperature of the susceptor coupled to the inductor appears to reach or drop below a minimum threshold.

The inductive heating device of the present invention may provide an improved heating of the aerosol-forming substrate of an aerosol-generating article received by the inductive heating device, compared to other known inductive heating devices. The inductive heating device of the present invention may further provide improved aerosol generation and an improved user experience compared to the inductive heating devices of the prior art.

Certain aerosol-forming substrates may generate a satisfactory or an acceptable aerosol when heated in a narrow temperature range only. As such, these aerosol-forming substrates may not be suitable for use with inductive heating devices that do not enable fine or close control of the heating of a susceptor coupled to the inductor. The inductive heating device of the present invention provides improved, fine or close control of heating of a susceptor coupled to the inductor and may enable the inductive heating device of the present invention to be used with aerosol-generating articles comprising such aerosol-forming substrates.

As used herein, the term 'inductive heating device is used to describe a device comprising an induction source that generates an alternating electromagnetic field. The induction source may couple to and interacts with a susceptor. The alternating magnetic field of the induction source may generate eddy currents in a susceptor which may heat the susceptor through resistive heating. The susceptor may also be further heated as a result of hysteresis losses.

As used herein, the term 'aerosol-generating device' or 'electrically operated aerosol-generating device' is used to describe a device that interacts with an aerosol-generating article having an aerosol-forming substrate to generate an aerosol. The aerosol-generating device may be a device that interacts with an aerosol-generating article to generate an aerosol that is directly inhalable into a user's lungs thorough the user's mouth. The aerosol-generating device may be a holder for an aerosol-generating article. The aerosol-generating device may be an inductive heating device and may comprise an induction source.

As used herein, the term 'aerosol-generating article' is used to describe an article that comprises an aerosol-forming substrate. In particular, as used herein in relation to the present invention, the term 'aerosol-generating article' is used to mean an article that comprises an aerosol-forming substrate and a susceptor in thermal communication with the aerosol-forming substrate.

An aerosol-generating article may be designed to engage with an electrically operated aerosol-generating device comprising an induction heating source. The induction heating source, or inductor, may generate a fluctuating electromagnetic field for heating the susceptor when the aerosol-generating article is located within the fluctuating electromagnetic field. In use, the aerosol-generating article may engage with the electrically operated aerosol-generating device such that the susceptor is located within the fluctuating electromagnetic field generated by the inductor.

As used herein, the term 'aerosol-forming substrate' is used to describe a substrate capable of releasing, upon heating, volatile compounds, which can form an aerosol. The aerosol generated from aerosol-forming substrates of aerosol-generating articles described herein may be visible or invisible and may include vapours (for example, fine particles of substances, which are in a gaseous state, that are ordinarily liquid or solid at room temperature) as well as gases and liquid droplets of condensed vapours.

As used herein, the term 'susceptor' is used to describe materials that can convert electromagnetic energy into heat. When located within a fluctuating electromagnetic field, eddy currents induced in the susceptor cause heating of the susceptor. Furthermore, magnetic hysteresis losses within the susceptor cause additional heating of the susceptor. As the susceptor is located in thermal contact or proximity with the aerosol-forming substrate, the aerosol-forming substrate is heated by the susceptor.

The term 'thermal proximity' is used herein with reference to the susceptor and aerosol-forming substrate to mean that the susceptor is positioned relative to the aerosol-forming substrate such that an adequate amount of heat is transferred from the susceptor to the aerosol-forming substrate to produce an aerosol. For example, the term 'thermal proximity' is meant to include embodiments in which the susceptor is in intimate physical contact with the aerosol-forming substrate. The term 'thermal proximity' is also meant to include embodiments in which the susceptor is spaced from the aerosol-forming substrate and configured to transfer an adequate amount of heat to the aerosol-forming substrate via convection or radiation.

The power supply electronics of the inductive heating device of the present invention may be configured to control the duration of the time interval between a first pulse and a second successive pulse based on the DC current supplied by the DC power supply during the first pulse. In other words, the power supply electronics may be configured to control the time interval between a first pulse and a second pulse based on one or more measurements of the DC current supplied by the DC power supply during the first pulse.

A reference DC current starting value may be stored on a memory of the power supply electronics. The reference DC current starting value may be a predetermined value that is set in the factory before first use of the device. However, in other embodiments the reference DC current starting value may be determined from previous uses of the device and stored in the memory of the power supply electronics. As such, the reference DC current starting value may change after each use of the device. At the start of a series of pulses, the power supply electronics may be configured to control the duration of the time interval between the first pulse in the series and the second pulse in the series based on a comparison between the reference DC current starting value and a measured DC current value supplied by the DC power supply during the first pulse.

A reference time interval duration value may also be stored on a memory of the power supply electronics. The reference time interval duration value may be a predetermined value that is set in the factory before first use of the device. However, in some embodiments, the reference time interval duration is determined from previous uses of the device and stored in the memory of the power supply electronics. At the start of a series of pulses, the power supply electronics may be configured to adjust the reference time interval duration value based on one or more measurement of the DC current supplied by the DC power supply during the first pulse of the series. The power supply electronics may be further configured to use the stored adjusted reference time interval duration value as the duration of the time interval between the first pulse in the series and the second pulse in the series. The power supply electronics may be configured to store the time interval duration between the first pulse in the series and the second pulse in the series as a reference value in the memory of the power supply electronics. In other words, the power supply electronics may be configured to overwrite the reference time interval duration value stored in the memory of the power supply electronics with the adjusted reference time interval duration value.

For subsequent pulses, the power supply electronics may be configured to adjust the stored reference time interval duration value based on measurements of the DC current supplied by the DC power supply during each successive pulse and use the adjusted value as the time interval duration between the subsequent successive pulses. As such, the power supply electronics may be configured to control the duration of the time intervals between successive pulses by iterative adjustments to a reference value stored in the memory of the power supply electronics.

Where the reference time interval duration is predetermined before the first use of the device, such as in the factory, the predetermined reference time interval may be between about 0.1 seconds and about 10 seconds, may be between about 0.1 seconds and about 7 seconds, may be between about 0.5 seconds and about 5 seconds and may be between about 0.5 seconds and about 4 seconds. A maximum reference time interval duration may also be stored in the memory of the power supply electronics, such that the adjustments to the reference time interval duration do not result in the time interval duration between successive pulses exceeding the maximum value. The maximum reference time interval duration may be between about 3 seconds and about 10 seconds, may be between about 3 seconds and about 7 seconds, may be between about 4 seconds and about 7 seconds and may be about 4 seconds. A minimum reference time interval duration may also be stored in the memory of the power supply electronics, such that the adjustments to the reference time interval duration do not result in the time interval duration between successive pulses falling below the minimum value. The minimum reference time interval duration may be between about 0.1 seconds and about 3 seconds, may be between about 0.1 seconds and about 2 seconds, may be between about 0.1 seconds and about 1 seconds and may be about 0.5 seconds.

The power supply electronics may be configured to make adjustments to the reference time interval duration value of a predetermined, absolute amount or a relative amount that is dependent on the deviation of the measured DC current value from the expected value. For example, the adjustments to the reference time interval duration value may comprise increasing or decreasing the reference time interval duration value by an absolute amount stored in the memory of the power supply electronics. In another example, the adjustments to the reference time interval duration value may comprise increasing or decreasing the stored reference time interval duration value by a fraction or percentage of a reference adjustment value stored in the memory of the power supply electronics, the fraction or percentage being determined based on the magnitude of the deviation of the measured DC current value from the expect value.

Where the adjustments to the reference time interval duration are a predetermined absolute amount, the predetermined adjustment value may be between about 0.1 seconds and about 10 seconds, may be between about 0.1 seconds and about 5 seconds, may be between about 0.1 seconds and 4 seconds and may be between about 0.1 seconds and 3.5 seconds.

Where the adjustments to the reference time interval duration comprise a relative amount, determined via a calculation or comparison, a maximum adjustment value may be stored in the memory of the power supply electronics, such that the adjustments to the reference time interval duration do not result in an excessive adjustment of the time interval duration between successive pulses. The maximum adjustment value may be between about 0.5 seconds and about 5 seconds, may be between about 0.5 seconds and about 3 seconds, may be between about 0.5 seconds and about 3.5 seconds and may be about 3.5 seconds. A minimum reference time interval duration may also be stored in the memory of the power supply electronics, such that the adjustments to the reference time interval duration do not result in an insignificant adjustment of the time interval duration between successive pulses. The minimum adjustment value may be between about 0.05 seconds and about 3 seconds, may be between about 0.05 seconds and about 1 seconds, may be between about 0.05 seconds and about 0.5 seconds and may be about 0.1 seconds.

During the time interval between two successive pulses, a susceptor coupled to the inductor is allowed to cool. The duration of the time interval between two successive pulses is ideally long enough for the susceptor to cool below the maximum temperature for generation of an acceptable aerosol, but not so long that the susceptor cools below a minimum temperature for generation of an acceptable aerosol. As such, each susceptor and aerosol-forming substrate arrangement may have a different and particular ideal duration of the time interval between successive pulses.

Some aerosol-forming substrates may generate an acceptable aerosol within a particular temperature range only, such as between about 200° C. and about 240° C. Thus, in some embodiments, the inductive heating device may be configured to maintain the temperature of a susceptor coupled to the inductor at or around a particular temperature or within a particular range of temperatures.

The power supply electronics may be configured to interrupt the supply of power from the DC power supply to the inductor if the measured DC current value indicates the temperature of a susceptor coupled to the inductor is at or above a predetermined maximum temperature. To achieve this, a predetermined reference DC current value, corresponding to a predetermined maximum temperature of a susceptor coupled to the inductor, may be stored in a memory of the power supply electronics. The power supply electronics may be configured to measure the DC current supplied from the DC power supply to the inductor, compare the measured DC current to the stored reference DC current value and interrupt the supply of power from the DC power supply to the inductor based on the comparison. For example, a predetermined minimum DC current value may be stored in a memory of the power supply electronics and the power supply electronics may be configured to interrupt the supply of power from the DC power supply to the inductor if the measured DC current value reaches or falls below the predetermined minimum DC current value.

In these embodiments, such an interruption in the supply of power from the DC power supply to the inductor may define the end of each of the successive pulses. Since the end of the each of the successive pulse is determined from measurements of the DC current supplied from the power supply to the inductor (i.e. from temperature of the susceptor), the duration of the pulses in these embodiments is not fixed.

In some embodiments, the power supply electronics may be configured to detect variations in the rate of change of the measured DC current values. In these embodiments, the power supply electronics may be configured to interrupt the supply of power from the DC power supply to the inductor based on a detection of a variation in the rate of change of the measured DC current values. For example, a susceptor coupled to the inductor of the inductive heating device may comprise a material having a Curie temperature that is below any predetermined maximum heating temperature for the aerosol-forming substrate, as described in more detail below. When the susceptor is heated to the Curie temperature, the rate of change of the measured DC current value may change. In other words, an extrema, such as a maximum or minimum, may be detected in the rate of change of the measured DC current as a phase change occurs in the susceptor material. This may provide an indication that the susceptor is at the Curie temperature and the aerosol-forming substrate is at the predetermined maximum temperature. Thus, the power supply electronics may be configured to interrupt the supply of power from the DC power supply to stop or prevent further heating of the aerosol-forming substrate.

In some embodiments, the power supply electronics may be configured to control the duration of the time interval between the first pulse and the second successive pulse based on an initial value of the DC current supplied by the DC power supply measured at the start of the first pulse.

The initial value of the DC current supplied by the DC power supply measured at the start of the first pulse is indicative of the temperature of a susceptor coupled to the inductor at the start of the first pulse. During a series of pluses, where the first pulse follows a previous time interval and a previous pulse, the initial value of the DC current supplied by the DC power supply measured at the start of the first pulse may provide an indication of how much the susceptor cooled during the previous time interval, between the previous pulse and the first pulse.

A predetermined reference initial DC current value may be stored in a memory of the power supply electronics. The reference initial DC current value may correspond to an ideal starting temperature of a susceptor coupled to the inductor. The ideal starting temperature of the susceptor may be within the range in which a particular aerosol-forming substrate generates an acceptable aerosol. The power supply electronics may measure the initial value of the DC current for the first pulse at the start of the first pulse. The measured initial value of the DC current at the start of the first pulse may then be compared to the reference initial DC current value stored in the memory of the power supply electronics.

As mentioned above, the power supply electronics may be configured to adjust the duration of a stored reference time interval duration that is equivalent to the duration of the previous time interval. This adjustment may be based on the comparison between the measured initial DC current value of the first pulse and the reference initial DC current value. For example, if the measured initial DC current value of the first pulse is above the reference initial DC current value, this may indicate that the temperature of the susceptor at the start of the first pulse was below the desired value. Therefore, the power supply electronics may be configured to reduce the duration of the time interval between the first pulse and the second pulse compared to the duration of the previous time interval between the previous pulse and the first pulse. This would provide less time between the first pulse and the second pulse for the susceptor to cool down compared to the length of time in the previous time interval between the previous pulse and the first pulse. Similarly, if the measured initial DC current value of the first pulse is below the reference initial DC current value, this may indicate that the temperature of the susceptor at the start of the first pulse was above the desired value. Therefore, the power supply electronics may be configured to increase the duration of the time interval between the first pulse and the second pulse compared to the duration of the previous time interval between the previous pulse and the first pulse. This would provide more time between the first pulse and the second pulse for the susceptor to cool down compared to the length of time in the previous time interval between the previous pulse and the first pulse.

The power supply electronics may be configured to control the duration of the time interval durations between successive pulses to adjust the temperature of the susceptor at the start of the next pulse. Over a series of pulses, this adjustment should iteratively adjust the measured initial DC current values to tend towards the predetermined reference DC current value. Thus, over a series of pulses, the initial DC current value of each of the pulses may tend to stabilize at the predetermined reference DC current value.

Independent adjustment of the duration of the pulses and the duration of the time intervals between successive pulses may provide particularly effective and efficient heating of a susceptor coupled to the inductor and generation of an acceptable aerosol from the aerosol-forming substrate in thermal proximity to the susceptor.

Once the measured initial DC current values have stabilized, fluctuations in the measured initial DC current values may indicate changes in the susceptor or aerosol-generating article. For example, a sudden increase in the initial DC current value may indicate that the susceptor has been rapidly cooled. Rapid cooling of the susceptor may occur by air being drawn over the susceptor during a puff on the aerosol-generating article by a user. As such, the power supply electronics of the inductive heating device may also be configured to detect puffs based on fluctuations in the measurements of DC current supplied by the DC power source to the inductor. Various proposals have been made in the art for adapting a susceptor in order to control the temperature of a susceptor in an aerosol-generating article. For example, in WO-A1-2015/177294 an aerosol-generating system is proposed that comprises a susceptor having a first susceptor material and a second susceptor material. The first susceptor material is in thermal proximity to the second susceptor material.

The term 'thermal proximity' is used herein with reference to a susceptor having a first susceptor material and a second susceptor material to mean that the first susceptor material is positioned relative to the second susceptor material such that when the susceptor is heated by an alternating electromagnetic field generated by an inductor, heat is transferred between the first susceptor material and the second susceptor material. For example, the term 'thermal proximity' is meant to include embodiments in which the first susceptor material is in intimate physical contact with the second susceptor material. The term 'thermal proximity' is also meant to include embodiments in which the first susceptor material is spaced from the second susceptor material and the first and second susceptor materials.

In some embodiments, the first and second susceptor materials may be in intimate contact or intimate physical contact, forming a unitary susceptor. In these embodiments, when heated, the first and second susceptor materials have substantially the same temperature.

The first susceptor material, which may be optimized for the heating of the aerosol-forming substrate, may have a first Curie temperature which is higher than any predefined maximum heating temperature for the aerosol-forming substrate. The second susceptor material, which may be optimized for regulating the temperature of the aerosol-forming substrate, may have a second Curie temperature which is below any predefined maximum heating temperature for the aerosol-forming substrate. Once the susceptor has reached the second Curie temperature, the magnetic properties of the second susceptor material change. At the second Curie temperature the second susceptor material reversibly changes from a ferromagnetic phase to a paramagnetic phase. During the inductive heating of the aerosol-forming substrate this phase-change of the second susceptor material may be detected by the inductive heating device without physical contact with the second susceptor material. Detection of the phase change may allow the inductive heating device to control the heating of the aerosol-forming substrate.

For example, on detection of a phase change associated with a second Curie temperature, inductive heating may be stopped automatically. Thus, an overheating of the aerosol-forming substrate may be avoided, even though the first susceptor material, which is primarily responsible for the heating of the aerosol-forming substrate, has no Curie temperature or a first Curie-temperature which is higher than the maximum desirable heating temperature. After the inductive heating has been stopped the susceptor cools down until it reaches a temperature lower than the second Curie temperature. At this point the second susceptor material regains its ferromagnetic properties again.

The inductive heating device of the present invention may be configured to receive an aerosol-generating article comprising a susceptor having a first susceptor material and a second susceptor material. The inductive heating device of the present invention may further be configured to control the supply of power from the DC power supply to the inductor based on detection of a phase change of a second susceptor material in the susceptor. In other words, the power supply electronics of the inductive heating device of the present invention may be configured to detect a phase change in a second susceptor material of a susceptor coupled to the inductor and stop or reduce the power supplied from the DC power supply on detection of a phase change.

In some particular embodiments of the present invention, the inductive heating device may be configured to receive an aerosol-generating article comprising a susceptor comprising a first susceptor material and a second susceptor material, the first susceptor material being disposed in thermal proximity to the second susceptor material, and the second susceptor material having a Curie temperature that is lower than 500° C. The power supply electronics of the inductive heating device of the present invention may be configured to: determine when the DC current supplied by the DC power supply is at a maximum DC current value; stop or reduce the supply of power from the DC power supply to the inductor when the maximum DC current value is determined; and after the determined time interval, start or increase the supply of power from the DC power supply, such that power is supplied to the inductor from the DC power supply in a plurality of pulses.

In these particular embodiments, the power supply electronics are not only configured to control the duration of the time interval between successive pulses of power supplied by the DC power supply, but also the power supply electronics are configured to control the duration of each pulse based on measurements of the DC current supplied by the DC power supply.

The relationship between the DC current supplied by the DC power supply and the temperature of a susceptor having two susceptor materials is described in more detail below, in particular with reference to FIG. 9. However, in general, the profile of the DC current supplied by the DC power supply exhibits a temporary inflection as the susceptor reaches the second Curie temperature and the second susceptor material experiences a phase change.

For example, in some of these particular embodiments the apparent resistance of the susceptor increases as the susceptor is heated to the second Curie temperature. When the susceptor reaches the second Curie temperature, the apparent resistance of the susceptor exhibits a first extrema, in this example, a maximum, and subsequently the apparent resistance of the susceptor decreases temporarily. This temporary decrease results from the second susceptor losing its magnetic properties during the phase change. Once the phase change is completed, the apparent resistance of the susceptor exhibits a second extrema, in this example, a minimum, and subsequently the apparent resistance of the susceptor increases again as the DC power supply continues to supply power to the inductor to heat the susceptor.

The measured DC current supplied from the DC power supply exhibits an inverse relationship to the apparent resistance of the susceptor, as expected from Ohm's law. As such, in this exemplary embodiment, the measured DC current decreases as the susceptor is heated to the second Curie temperature. At the second Curie temperature, the measured DC current reaches a minimum $I_{DCMIN}$ and temporarily increases until it reaches a maximum $I_{DCMAX}$ after which the measured DC current decreases again as the susceptor is heated further.

The power supply electronics of the inductive heating device of the present invention may be configured to detect the Curie transition of the second susceptor material. In other words, the power supply electronics of the inductive heating device of the present invention may be configured to detect a temporary inflection in the profile of the DC current supplied by the DC power supply caused by the phase change of the second susceptor material. Detection of the Curie transition may enable the power supply electronics to determine when to stop or reduce the amount of power being supplied to susceptor to avoid the susceptor from overheating the aerosol-forming substrate.

Detection of an extrema, such as a maximum or minimum value, in measurements of the DC current supplied by the DC power supply may indicate that a phase change of a susceptor material is taking place. In particular, detection of a first extrema, such as a minimum, in the DC current supplied by the DC power supply may indicate that the susceptor has reached the second Curie temperature. Detection of a second extrema, such as a maximum, in the DC current supplied by the DC power supply may indicate that the phase change of the second susceptor material has taken place.

The inflection in the DC current supplied by the DC power supply provides an indicator of the temperature of the susceptor. The Curie temperature of the second susceptor material may be chosen to be within a temperature range for generating a suitable or an acceptable aerosol from the aerosol-forming substrate without igniting the aerosol-forming substrate.

In some embodiments, the power supply electronics may be configured detect a maximum value of the DC current and to interrupt the supply of power from the DC power supply to the inductor when the maximum value is detected. This interruption may define the end of a pulse of power from the DC current supply to the inductor.

The power supply electronics may be further configured to determine when the DC current supplied by the DC power supply is at a minimum DC current value.

The power supply electronics may be further configured to control the duration of the time interval between a first pulse and a second successive pulse based on: an initial DC current supplied by the DC power supply measured at the start of the first pulse; a determined minimum DC current value of the first pulse; and the determined maximum DC current value of the first pulse.

In some particular embodiments, the power supply electronics may be configured to: determine a mid-point between the determined minimum DC current value of the first pulse and the determined maximum DC current value of the first pulse; compare the initial DC current value of the first pulse and the determined mid-point between the minimum DC current value of the first pulse and the maximum DC current value of the first pulse; and control the duration of the time interval between the first pulse and the second pulse based on the comparison.

For each particular susceptor and aerosol-forming substrate arrangement, the determined maximum and minimum DC current values should be the same or very similar. This is because, for each particular susceptor and aerosol-forming substrate arrangement, the determined maximum and minimum DC current values should occur when the susceptor is at a particular temperature, which should be the same for each pulse (i.e. when the susceptor is at or near the second Curie temperature). Accordingly, the mid-point between the determined maximum and minimum DC current values should be the same or very similar for each successive pulse.

It has been found that the mid-point between the determined maximum and minimum DC current values is a suitable initial DC current value for each pulse. Thus, similar to the iterative process described above, the power supply electronics may be configured to adjust the time interval durations between successive pulses such that the initial DC current values of the pulses tend to stabilise at the mid-point between the determined minimum and maximum DC current values over a number of pulses.

By using the mid-point between the determined maximum and minimum DC current values in the comparison with the measured initial DC current value, rather than a predetermined reference value, the inductive heating device of the present invention may be suitable for use with different arrangements of susceptors and aerosol-forming substrates.

The inductive heating device of the first aspect of the present invention and an aerosol-generating article may form an electrically operated aerosol-generating system according to a second aspect of the present invention. The aerosol-generating article may comprise an aerosol-forming substrate and a susceptor in thermal proximity to the susceptor. The inductive heating device may be configured to receive the susceptor and to heat the susceptor when the aerosol-generating article is received by the inductive heating device. The inductor of the inductive heating device may generate a fluctuating electromagnetic field to induce eddy currents in the susceptor, causing the susceptor to heat up.

The inductive heating device or electrically operated aerosol-generating device of the present invention may comprise: a housing; a cavity for receiving an aerosol-generating article; an inductor arranged to generate a fluctuating electromagnetic field within the cavity; a DC power supply for supplying electrical power to the inductor; and power supply electronics configured to control the supply of power from the power supply to the inductor.

The inductive heating device comprises a DC power supply for supplying electrical power to the inductor. The DC power supply is configured to supply a DC supply voltage and a DC current. The DC power supply may be any suitable DC power supply. For example, the DC power supply may be a single use battery or a rechargeable battery. In some embodiments, the power supply may be a Lithium-ion battery. In other embodiments, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. In some embodiments, the DC power supply may comprise one or more capacitors, super capacitors or hybrid capacitors. The DC power supply may comprise one or more lithium ion hybrid capacitors.

The DC power supply may be configured to supply any suitable DC voltage and DC current. The DC power supply may be configured to supply a DC voltage in the range of between about 2.5 Volts and about 4.5 Volts and a DC current in the range of between about 2.5 Amperes and about 5 Amperes, corresponding to a DC power in the range of between about 6.25 Watts and about 22.5 Watts.

The inductive heating device also comprises an inductor for coupling to a susceptor of an aerosol-generating article. The inductor may comprise a coil. The coil may be a helically wound cylindrical inductor coil. The inductor may be positioned on or adjacent to the internal surface of the cavity of the device. The coil may surround the cavity. In some embodiments, the inductor coil may have an oblong shape and define an inner volume in the range of about 0.15 $cm^3$ to about 1.10 $cm^3$. For example, the inner diameter of the helically wound cylindrical inductor coil may be between about 5 mm and about 10 mm or about 7 mm, and the length of the helically wound cylindrical inductor coil may be between about 8 mm and about 14 mm. The diameter or the thickness of the inductor coil wire may be between about 0.5 mm and about 1 mm, depending on whether a coil wire with a circular cross-section or a coil wire with a flat rectangular cross-section is used. The helically wound inductor coil may be positioned on or adjacent the internal surface of the cavity. A helically wound cylindrical inductor coil positioned on or adjacent the internal surface of the cavity enables the device to be compact. The inductor may comprise one coil or more than one coil.

The inductive heating device also comprises power supply electronics configured to control the supply of power from the DC power supply to the inductor.

The power supply electronics may comprise DC/AC converter or inverter for converting DC current from the DC power supply into an AC current for supply to the inductor.

The DC/AC converter may be configured to operate at high frequency. As used herein, the term "high frequency" is used to describe a frequency ranging from about 1 Megahertz (MHz) to about 30 Megahertz (MHz), from about 1 Megahertz (MHz) to about 10 MHz (including the range of about 1 MHz to about 10 MHz), and from about 5 Megahertz (MHz) to about 7 Megahertz (MHz) (including the range of about 5 MHz to about 7 MHz).

The DC/AC converter may comprise an LC load network. The LC network may comprise the inductor for coupling to a susceptor of an aerosol-generating article. The inductor may be arranged in series with a capacitor in the LC load network. The LC load network may further comprise a shunt capacitor.

The LC load network may be configured to operate at low ohmic load. As used herein, the term "low ohmic load" is used to describe an ohmic load smaller than about 2 Ohms. The electrical resistance of the inductor may typically be a few tenths of an Ohm. Typically, the electrical resistance of the susceptor will be higher than the electrical resistance of the inductor, so that the susceptor may be configured to efficiently convert the majority of the electrical power supplied to it into heat for heating the aerosol-forming substrate. During heating of the susceptor, the electrical resistance of the susceptor will also typically increase as the temperature of the susceptor increases. In operation, the electrical resistance of the susceptor may be effectively added to the electrical resistance of the inductor to increase the ohmic load of the LC load network.

The DC/AC converter may comprise a power amplifier. In particular, the DC/AC converter may comprise a Class-E power amplifier comprising a transistor switch and a transistor switch driver circuit. Class-E power amplifiers are generally known and are described in detail, for example, in the article "Class-E RF Power Amplifiers", Nathan O. Sokal, published in the bimonthly magazine QEX, edition January/February 2001, pages 9-20, of the American Radio Relay League (ARRL), Newington, Conn., U.S.A. Class-E power amplifiers may advantageously operate at high frequencies, while also having a relatively simple circuit structure comprising a small number of components (e.g. Class-E power amplifiers require one transistor switch only, which is advantageous over Class-D power amplifiers, which require two transistor switches controlled at high frequency to ensure that when one of the two transistors is switched off, the other of the two transistors is switched on). In addition, Class-E power amplifiers are known to have low power dissipation across the switching transistor during switching transitions. The Class-E power amplifier may be a single-ended first order Class-E power amplifier having a single transistor switch only.

In embodiments comprising a Class-E power amplifier, the transistor switch may be any suitable type of transistor. For example, the transistor may be a bipolar-junction transistor (BJT) or a field effect transistor (FET), such as a metal-oxide-semiconductor field effect transistor (MOSFET) or a metal-semiconductor field effect transistor (MESFET).

The class E power amplifier may have an output impedance and the power supply electronics may further comprise a matching network for matching the output impedance of the class E power amplifier to the low ohmic load of the LC load network. For example, the matching network may comprise a small matching transformer. The matching network may improve power transfer efficiency between the inverter or converter and the inductor.

The power supply electronics may also comprise a microcontroller. The microcontroller may be programmed to control the duration of each pulse of power supplied by the DC power supply to the inductor. The microcontroller may be programmed to control the duration of the time interval between successive pulses of power supplied by the DC power supply to the inductor. The microcontroller may be programmed to determine an apparent resistance ($R_a$) of a susceptor of an aerosol-generating article engaged with the inductive heating device. The microcontroller may be programmed to determine an apparent resistance ($R_a$) of the susceptor from measurements of at least one of the DC voltage ($V_{DC}$) supplied from the DC power supply and the DC current ($I_{DC}$) drawn from the DC power supply. The microcontroller may be further programmed to determine the temperature of the susceptor of the aerosol-generating article from the apparent resistance ($R_a$). The microcontroller may also be further programmed to determine the temperature of the aerosol-forming substrate of the aerosol-generating article from the temperature of the susceptor.

The power supply electronics may be configured to measure the DC current drawn from the DC power supply. The power supply electronics may comprise a current sensor for measuring the DC current drawn from the DC power supply. The power supply electronics may be provided with any suitable current sensor.

The power supply electronics may also be configured to measure the DC voltage supplied by the DC power supply. The power supply electronics may comprise a voltage sensor for measuring the DC voltage supplied by the DC power supply. The power supply electronics may comprise any suitable voltage sensor.

It has been found that an apparent resistance of the susceptor may be determined from measurements of the DC voltage and the DC current drawn from the DC power supply. Surprisingly, the apparent resistance of a susceptor varies with the temperature of the susceptor in a strictly monotonic relationship over certain ranges of temperature of the susceptor. This strictly monotonic relationship allows for an unambiguous determination of the temperature of the susceptor from a determination of the apparent resistance, as each determined value of the apparent resistance is representative of only one single value of the temperature, there is no ambiguity in the relationship. Although the relationship between the temperature of the susceptor and the apparent resistance is monotonic, it is not necessarily linear. The monotonic relationship of the temperature of the susceptor and the apparent resistance allows for the determination and control of the temperature of the susceptor and thus for the determination and control of the temperature of the aerosol-forming substrate.

The apparent resistance of the susceptor may be calculated from the known relationship between the DC current drawn from the DC power supply and the DC voltage supplied by the DC power supply, according to Ohm's law. Typically, the apparent resistance of the susceptor is determined based on measurements of the DC current drawn from the DC power supply. The apparent resistance of the susceptor may also be determined based on measurements of the DC voltage supplied from the DC power supply. However, in some embodiments the DC power supply may be configured to supply a constant DC voltage value. In these embodiments, the constant voltage value supplied by the DC power supply may be known and may be stored, such as in a memory of the microprocessor of the power supply electronics, and may be used in the determination of the apparent resistance of the susceptor. Therefore, in embodiments comprising a constant voltage DC power supply it is not essential for the power supply electronics to be configured to measure the DC voltage supplied by the DC power supply. This may reduce one or more of the number of components, the complexity, the size and the cost of the power supply electronics. It will be appreciated that in some embodiments comprising a constant voltage DC power supply, the power supply electronics may be configured to measure the DC voltage supplied by the DC power supply and measurements of the DC voltage may be used in the determination of the apparent resistance of the susceptor.

In some embodiments, where the DC power supply comprises a DC power supply that supplied a constant voltage value, the power supply electronics may be configured to store a reference constant voltage value that is indicative of the constant voltage value supplied by the constant voltage DC power supply. In these embodiments, the power supply electronics may not be required to monitor the DC voltage supplied by the DC power supply. However, it will be appreciated that in these embodiments a voltage sensor may also be provided for monitoring the DC voltage value supplied by the DC power supply.

The power supply electronics may also comprise an additional inductor arranged as a DC choke.

The size or total volume of the power supply electronics may be particularly small. For example, the size or total volume of the power supply electronics may be equal to or less than 2 cm$^3$. This small size is due to the low number of components of the power supply electronics. A particularly small size or volume is possible in embodiments where the inductor of the LC load network is used as the inductor for the inductive coupling to the susceptor of the aerosol-forming article. A particularly small size or volume is also possible in embodiments that do not comprise a matching network. The small size or small volume of the power supply electronics helps to keep the overall size or volume of the inductive heating device particularly small.

The inductive heating device also comprises a cavity for receiving an aerosol-generating article. The cavity may have an internal surface shaped to accommodate at least a portion of the aerosol-forming substrate of an aerosol-generating article. The cavity may be arranged such that upon accommodation of a portion of the aerosol-forming substrate of an aerosol-generating article in the cavity, the inductor of the LC load network is inductively coupled to the susceptor of the aerosol-forming substrate during operation. This arrangement may enable the inductor of the LC load network to couple to the susceptor of the aerosol-generating article and heat the susceptor through induction of eddy currents. This arrangement may eliminate the need for additional components such as matching networks for matching the output impedance of the Class-E power amplifier to the load, thus allowing to further minimize the size of the power supply electronics.

The inductive heating device may comprise means for operating the device. In some embodiments, the means for operating the device may comprise a simple user-operated switch.

Overall, the inductive heating device of the present invention provides a small and easy to handle, efficient, clean and robust heating device. This is primarily due to the contactless heating of the substrate and the arrangement and configuration of the power supply electronics.

For susceptors forming low ohmic loads and having an electrical resistance significantly higher than the electrical resistance of the inductor of the LC load network, as specified above, the inductive heating device of the present invention may heat the susceptor to a temperature in the range of 300-400 degrees Celsius in a time period of around five seconds, or even less than five seconds in some embodiments. At the same time, the temperature of the inductor of the inductive heating device may be maintained well below the temperature of the susceptor due to a vast majority of the power being converted to heat in the susceptor, rather than in the inductor.

In some embodiments, the inductive heating device may be configured to supply power to a susceptor arranged within an aerosol-forming substrate such that the aerosol-forming substrate may be heated to an average temperature of between about 200° C. and about 240° C. The inductive heating device may be capable of generating a fluctuating electromagnetic field having a magnetic field strength (H-field strength) of between about 1 kilo amperes per metre (kA/m) and about 5 kA/m, between about 2 kA/m and about 3 kA/m or about 2.5 kA/m. The inductive heating device may be capable of generating a fluctuating electromagnetic field having a frequency of between about 1 MHz and about 30 MHz, between about 1 MHz and about 10 MHz or between about 5 MHz and about 7 MHz.

The inductive heating device may be a portable or hand-held electrically operated aerosol-generating device that is comfortable for a user to hold between the fingers of a single hand.

The inductive heating device may have a length of between about 70 millimetres and about 120 millimetres.

The inductive heating device may be substantially cylindrical in shape.

Specifically, the inductive heating device may comprise: a device housing; and a cavity arranged in the device housing, the cavity having an internal surface shaped to accommodate at least a portion of the aerosol-forming substrate, the cavity being arranged such that upon accommodation of the portion of the aerosol-forming substrate in the cavity, the inductor is inductively coupled to the susceptor of the inductive heating device during operation of the device. The power supply electronics may also be configured to operate at high frequency, the DC/AC converter comprising an LC load network configured to operate at low ohmic load, wherein the LC load network comprises a series connection of a capacitor and the inductor having an ohmic resistance, and wherein the power supply electronics comprises a microcontroller programmed to control the power supplied from the DC power supply to the inductor.

An aerosol-generating article may also be provided as part of an aerosol-generating system according to a second aspect of the present invention. The aerosol-generating article may be in the form of a rod that comprises two ends: a mouth end, or proximal end, through which aerosol exits the aerosol-generating article and is delivered to a user, and a distal end. In use, a user may draw on the mouth end in order to inhale aerosol generated by the aerosol-generating article. The mouth end is downstream of the distal end. The distal end may also be referred to as the upstream end and is upstream of the mouth end.

As used herein, the terms 'upstream' and 'downstream' are used to describe the relative positions of elements, or portions of elements, of the aerosol-generating article in relation to the direction in which a user draws on the aerosol-generating article during use thereof.

When used herein in relation to an aerosol-generating article, the term 'longitudinal' is used to describe the direction between the mouth end and the distal end of the aerosol-generating article and the term 'transverse' is used to describe the direction perpendicular to the longitudinal direction.

As used herein in relation to an aerosol-generating article, the term 'diameter' is used to describe the maximum dimension in the transverse direction of the aerosol-generating article. When used herein in relation to an aerosol-generating article, the term 'length' is used to describe the maximum dimension in the longitudinal direction of the aerosol-generating article.

The aerosol-generating article comprises a susceptor. The susceptor is arranged in thermal proximity to the aerosol-forming substrate. Thus, when the susceptor heats up the aerosol-forming substrate is heated up and an aerosol is formed. The susceptor may be arranged in direct or intimate physical contact with the aerosol-forming substrate, for example within the aerosol-forming substrate.

The susceptor may be in the form of a pin, rod, or blade. The susceptor may have a length of between about 5 mm and about 15 mm, between about 6 mm and about 12 mm or between about 8 mm and about 10 mm. The susceptor may have a width of between about 1 mm and about 6 mm and may have a thickness of between about 10 micrometres and about 500 micrometres or between about 10 and 100 about micrometres. If the susceptor has a constant cross-section, for example a circular cross-section, it may have a width or diameter of between about 1 mm and about 5 mm.

The susceptor may have a length dimension that is greater than its width dimension or its thickness dimension, for example greater than twice its width dimension or its thickness dimension. Thus the susceptor may be described as an elongate susceptor. The susceptor may be arranged substantially longitudinally within the rod. This means that the length dimension of the elongate susceptor is arranged to be about parallel to the longitudinal direction of the rod, for example within plus or minus 10 degrees of parallel to the longitudinal direction of the rod. The elongate susceptor element may be positioned in a radially central position within the rod, and extend along the longitudinal axis of the rod.

In some embodiments, the aerosol-generating article may contain a single susceptor. In other embodiments, the aerosol-generating article may comprise more than one susceptor. The aerosol-generating article may have more than one elongate susceptor. Thus, heating may be efficiently effected in different portions of the aerosol-forming substrate.

In some preferred embodiments, the susceptor comprises a first susceptor material and a second susceptor material. The first susceptor material may be disposed in thermal proximity to the second susceptor material. The first susceptor material may be disposed in intimate physical contact with the second susceptor material. The second susceptor material may have a Curie temperature that is lower than 500° C. The first susceptor material may be used primarily to heat the susceptor when the susceptor is placed in a fluctuating electromagnetic field. Any suitable material may be used. For example the first susceptor material may be aluminium, or may be a ferrous material such as a stainless steel. The second susceptor material may be used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys.

By providing a susceptor having at least a first and a second susceptor material, with either the second susceptor material having a Curie temperature and the first susceptor material not having a Curie temperature, or first and second susceptor materials having first and second Curie temperatures distinct from one another, the heating of the aerosol-forming substrate and the temperature control of the heating may be separated. While the first susceptor material may be optimized with regard to heat loss and thus heating efficiency, the second susceptor material may be optimized in respect of temperature control. The second susceptor material need not have any pronounced heating characteristic. The second susceptor material may be selected to have a Curie temperature, or second Curie temperature, which corresponds to a predefined maximum desired heating temperature of the first susceptor material. As used herein, the term 'second Curie temperature' refers to the Curie temperature of the second susceptor material.

More specifically, the susceptor may comprise a first susceptor material having a first Curie temperature and a second susceptor material having a second Curie temperature, the first susceptor material being disposed in thermal proximity to the second susceptor material. The second Curie temperature may be lower than the first Curie temperature.

The maximum desired heating temperature may be defined such that a local overheating or burning of the aerosol-forming substrate is avoided. The susceptor comprising the first and second susceptor materials may have a unitary structure and may be termed a bi-material susceptor or a multi-material susceptor. The immediate proximity of the first and second susceptor materials may be of advantage in providing an accurate temperature control.

The first susceptor material may be a magnetic material having a Curie temperature that is above about 500° C. It is desirable from the point of view of heating efficiency that the Curie temperature of the first susceptor material is above any maximum temperature that the susceptor should be capable of being heated to. The second Curie temperature may be selected to be lower than about 400° C., lower than about 380° C. or lower than about 360° C. The second susceptor material may be a magnetic material selected to have a second Curie temperature that is substantially the same as a desired maximum heating temperature. That is, the second Curie temperature may be about the same as the temperature that the susceptor should be heated to in order to generate an aerosol from the aerosol-forming substrate. The second Curie temperature may, for example, be within the range of about 200° C. to about 400° C. or between about 250° C. and about 360° C.

In some embodiments, the second Curie temperature of the second susceptor material may be selected such that, upon being heated by a susceptor that is at a temperature equal to the second Curie temperature, an overall average temperature of the aerosol-forming substrate does not exceed 240° C. The overall average temperature of the aerosol-forming substrate here is defined as the arithmetic mean of a number of temperature measurements in central regions and in peripheral regions of the aerosol-forming substrate. By pre-defining a maximum for the overall average temperature the aerosol-forming substrate may be tailored to an optimum production of aerosol.

The first susceptor material may be selected for maximum heating efficiency. Inductive heating of a magnetic susceptor material located in a fluctuating magnetic field occurs by a combination of resistive heating due to eddy currents induced in the susceptor, and heat generated by magnetic hysteresis losses.

In some embodiments, the first susceptor material may be a ferromagnetic metal having a Curie temperature in excess of 400° C. The first susceptor may be iron or an iron alloy such as a steel, or an iron nickel alloy. The first susceptor material may be a 400 series stainless steel such as grade 410 stainless steel, or grade 420 stainless steel, or grade 430 stainless steel.

In other embodiments, the first susceptor material may be a suitable non-magnetic material, such as aluminium. In a non-magnetic material inductive heating occurs solely by resistive heating due to eddy currents.

The second susceptor material may be selected for having a detectable Curie temperature within a desired range, for example at a specified temperature between 200° C. and 400° C. The second susceptor material may also make a contribution to heating of the susceptor, but this property is less important than its Curie temperature. The second susceptor material may be a ferromagnetic metal such as nickel or a nickel alloy. Nickel has a Curie temperature of about 354° C., which may be ideal for temperature control of heating in an aerosol-generating article.

The first and second susceptor materials may be in thermal proximity, such as in intimate contact forming a unitary susceptor. Thus, the first and second susceptor materials have the same temperature when heated. The first susceptor material, which may be optimized for the heating of the aerosol-forming substrate, may have a first Curie temperature which is higher than any predefined maximum heating temperature.

The susceptor may be configured for dissipating energy of between 1 Watt and 8 Watt when used in conjunction with a particular inductor, for example between 1.5 Watt and 6 Watt. By configured, it is meant that the susceptor may comprise a specific first susceptor material and may have specific dimensions that allow energy dissipation of between 1 Watt and 8 Watt when used in conjunction with a particular conductor that generates a fluctuating magnetic field of known frequency and known field strength.

Suitable susceptors having a first susceptor material and a second susceptor material are described in more detail in international patent publication number WO-A1-2015177294A1. The aerosol-generating article also comprises an aerosol-forming substrate. The aerosol-forming substrate may be a solid aerosol-forming substrate. The aerosol-forming substrate may comprise both solid and liquid components.

The aerosol-forming substrate may comprise nicotine. In some embodiments, the aerosol-forming substrate may comprise tobacco. For example, the aerosol-forming material may be formed from a sheet of homogenised tobacco. The aerosol-forming substrate may be a rod formed by gathering a sheet of homogenised tobacco. The aerosol-forming substrate may comprise a gathered textured sheet of homogenised tobacco material. The aerosol-forming substrate may comprise a gathered crimped sheet of homogenised tobacco material.

As used herein, the term 'homogenised tobacco material' denotes a material formed by agglomerating particulate tobacco. As used herein, the term 'sheet' denotes a laminar element having a width and length substantially greater than the thickness thereof. As used herein, the term 'gathered' is used to describe a sheet that is convoluted, folded, or otherwise compressed or constricted substantially transversely to the longitudinal axis of the aerosol-generating article. As used herein, the term 'textured sheet' denotes a sheet that has been crimped, embossed, debossed, perforated or otherwise deformed. As used herein, the term 'crimped sheet' denotes a sheet having a plurality of substantially parallel ridges or corrugations.

The aerosol-forming substrate may comprise a non-tobacco containing aerosol-forming material. For example, the aerosol-forming material may be formed from a sheet comprising a nicotine salt and an aerosol former.

The aerosol-forming substrate may comprise at least one aerosol-former. As used herein, the term 'aerosol former' is used to describe any suitable known compound or mixture of compounds that, in use, facilitates formation of an aerosol and that is substantially resistant to thermal degradation at the operating temperature of the aerosol-generating article. Suitable aerosol-formers are known in the art.

If the aerosol-forming substrate is a solid aerosol-forming substrate, the solid aerosol-forming substrate may comprise, for example, one or more of: powder, granules, pellets, shreds, strands, strips or sheets containing one or more of: herb leaf, tobacco leaf, tobacco ribs, expanded tobacco and homogenised tobacco. The solid aerosol-forming substrate may contain tobacco or non-tobacco volatile flavour compounds, which are released upon heating of the solid aerosol-forming substrate. The solid aerosol-forming substrate may also contain one or more capsules that, for example, include additional tobacco volatile flavour compounds or non-tobacco volatile flavour compounds and such capsules may melt during heating of the solid aerosol-forming substrate.

The solid aerosol-forming substrate may be provided on or embedded in a thermally stable carrier.

The aerosol-forming substrate may be in the form of a plug comprising an aerosol-forming material circumscribed by a paper or other wrapper. Where an aerosol-forming substrate is in the form of a plug, the entire plug including any wrapper is considered to be the aerosol-forming substrate. The one or more susceptors may be elongate and the one or more elongate susceptors may be positioned within the plug in direct or intimate physical contact with the aerosol-forming material.

The aerosol-forming substrate may have an external diameter of at least about 5 mm. The aerosol-forming substrate may have an external diameter of between about 5 mm and about 12 mm. In some embodiments, the aerosol-forming substrate may have an external diameter of 7.2 mm+/−10%.

The aerosol-forming substrate may have a length of between about 5 mm and about 15 mm. The elongate susceptor may be about the same length as the aerosol-forming substrate.

The aerosol-forming substrate may be substantially cylindrical.

The aerosol-generating article may also comprise a support element located immediately downstream of the aerosol-forming substrate. The support element may abut the aerosol-forming substrate.

The aerosol-generating article may also comprise an aerosol-cooling element located downstream of the aerosol-forming substrate, for example an aerosol-cooling element may be located immediately downstream of a support element and may abut the support element. The aerosol-cooling element may be located between the support element and a mouthpiece located at the extreme downstream end of the aerosol-generating article. The aerosol-cooling element may be termed a heat exchanger.

The aerosol-generating article may further comprise a mouthpiece located at the mouth end of the aerosol-generating article. The mouthpiece may be located immediately downstream of an aerosol-cooling element and may abut the aerosol-cooling element. The mouthpiece may comprise a filter. The filter may be formed from one or more suitable filtration materials. Many such filtration materials are known in the art. In one embodiment, the mouthpiece may comprise a filter formed from cellulose acetate tow.

The elements of the aerosol-generating article, for example the aerosol-forming substrate and any other elements of the aerosol-generating article such as a support element, an aerosol-cooling element and a mouthpiece, may be circumscribed by an outer wrapper. The outer wrapper may be formed from any suitable material or combination of materials. The outer wrapper may be a cigarette paper.

The aerosol-generating article may have an external diameter of between about 5 millimetres and about 12 millimetres, for example of between about 6 millimetres and about 8 millimetres. The aerosol-generating article may have an external diameter of 7.2 millimetres+/−10%.

The aerosol-generating article may have a total length of between about 30 millimetres and about 100 millimetres. The aerosol-generating article may have a total length of between 40 mm and 50 mm, for example about 45 millimetres.

According to a third aspect of the present invention, there is provided a method for operating an inductive heating device according to the first aspect of the present invention. The method comprises:

supplying power to the inductor from the DC power supply via the DC/AC converter for heating the susceptor of the aerosol-generating article when the aerosol-generating article is received by the inductive heating device, the supply of power being provided in a plurality of pulses separated by time intervals; and controlling the duration of the time intervals between successive pulses based on the DC current supplied by the DC power supply.

The controlling of the duration of the time intervals may comprise controlling the time interval between a first pulse and a second successive pulse based on an initial value of the DC current supplied by the DC power supply measured at the start of the first pulse.

The controlling the duration of the time interval may further comprise:

storing a reference time interval duration value, a maximum DC current value and a minimum DC current value on a memory of the power supply electronics;

calculating a mid-point between the maximum DC current value and the minimum DC current value;

measuring the DC current supplied by the DC power supply;

comparing an initial DC current value measured at the start of the first pulse to the calculated mid-point;

adjusting the reference time interval duration value based on the comparison; and controlling the time interval duration between the first pulse and the second pulse such that the time interval duration between the first pulse and the second pulse is equal to the adjusted reference time interval duration.

According to a fourth aspect of the present invention, there is provided a method for operating an inductive heating device according to the first aspect of the present invention, wherein the inductive heating device is configured to receive an aerosol-generating article comprising a susceptor comprising a first susceptor material and a second susceptor material, the first susceptor material being disposed in thermal proximity to the second susceptor material, and the second susceptor material having a Curie temperature that is lower than 500° C. The method comprises:

supplying power to the inductor from the DC power supply via the DC/AC converter for heating the susceptor of the aerosol-generating article when the aerosol-generating article is received by the inductive heating device;

determining an initial value of the DC current supplied by the power supply;

determining when the DC current supplied by the power supply is at a minimum DC current value;

determining when the DC current supplied by the DC power supply is at a maximum DC current value;

calculating a mid-point between the maximum DC current value and the minimum DC current value;

comparing the initial DC current value to the mid-point between the minimum DC current value and the maximum DC current value;

determining a time interval based on the comparison;

interrupting the supply of power from the DC power supply to the inductor when the maximum DC current value is determined; and after the determined time interval has elapsed, resuming the supply of power from the DC power supply such that power is supplied to the inductor from the DC power supply.

According to a fifth aspect of the present invention there is provided a control system for an inductive heating device according to the first aspect of the present invention, the control system comprising a microcontroller programmed to perform any of the method steps according to the third or fourth aspects of the present invention.

It will be appreciated that features described in relation to one aspect of the invention may be applied to any other aspects of the invention, either alone or in combination with other described aspects and features of the invention.

BRIEF DESCRIPTION OF DRAWINGS

It will be appreciated that whenever the term "about" is used herein in connection with a particular value, the value following the term "about" does not have to be exactly the particular value due to technical considerations. However, the term "about" used herein in connection with a particular value is to be understood to include and also to explicitly disclose the particular value following the term "about".

Features described in relation to one aspect or embodiment may also be applicable to other aspects and embodiments. Specific embodiments will now be described with reference to the figures, in which.

SPECIFIC DESCRIPTION

Figure 1:
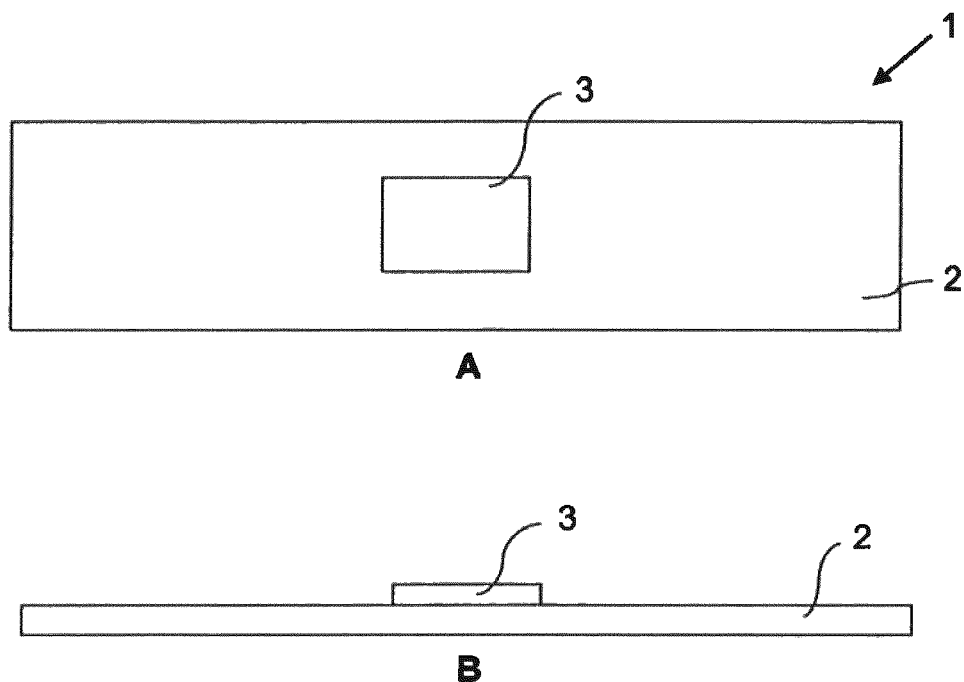
FIG. 1A is a plan view of a susceptor for use in an aerosol-generating article of an aerosol-generating system according to an embodiment of the present invention.
FIG. 1B is a side view of the susceptor of FIG. 1A.

FIG. 1A and FIG. 1B illustrate a specific example of a unitary multi-material susceptor for use in an aerosol-generating article of an aerosol-generating system according to an embodiment of the present invention. The susceptor 1 is in the form of an elongate strip having a length of 12 mm and a width of 4 mm. The susceptor is formed from a first susceptor material 2 that is intimately coupled to a second susceptor material 3. The first susceptor material 2 is in the form of a strip of grade 430 stainless steel having dimensions of 12 mm by 4 mm by 35 micrometres. The second susceptor material 3 is a patch of nickel of dimensions 3 mm by 2 mm by 10 micrometres. The patch of nickel has been electroplated onto the strip of stainless steel. Grade 430 stainless steel is a ferromagnetic material having a Curie temperature in excess of 400° C. Nickel is a ferromagnetic material having a Curie temperature of about 354° C.

It will be appreciated that in other embodiments of the invention, the material forming the first and second susceptor materials may be varied. It will also be appreciated that in other embodiments of the invention there may be more than one patch of the second susceptor material located in intimate physical contact with the first susceptor material.

Figure 2:
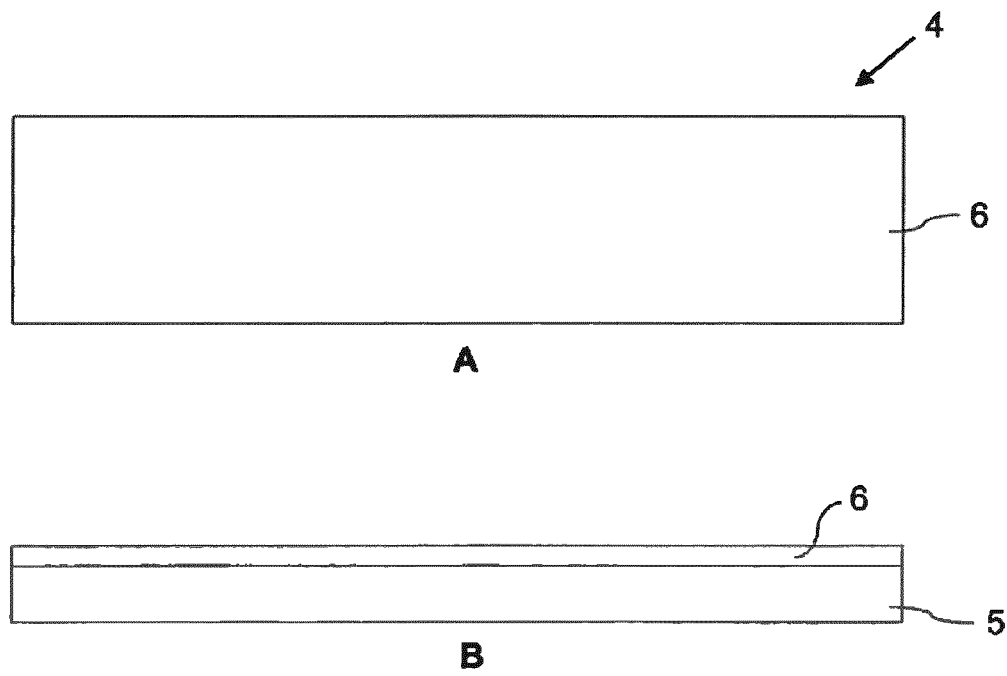
FIG. 2A is a plan view of a another susceptor for use in an aerosol-generating article of an aerosol-generating system according to another embodiment of the present invention.
FIG. 2B is a side view of the susceptor of FIG. 2A.

FIG. 2A and FIG. 2B illustrate a second specific example of a unitary multi-material susceptor for use in an aerosol-generating article of an aerosol-generating system according to another embodiment of the present invention. The susceptor 4 is in the form of an elongate strip having a length of 12 mm and a width of 4 mm. The susceptor is formed from a first susceptor material 5 that is intimately coupled to a second susceptor material 6. The first susceptor material 5 is in the form of a strip of grade 430 stainless steel having dimensions of 12 mm by 4 mm by 25 micrometres. The second susceptor material 6 is in the form of a strip of nickel having dimensions of 12 mm by 4 mm by 10 micrometres. The susceptor is formed by cladding the strip of nickel 6 to the strip of stainless steel 5. The total thickness of the susceptor is 35 micrometres. The susceptor 4 of FIG. 2 may be termed a bi-layer or multilayer susceptor.

Figure 3:
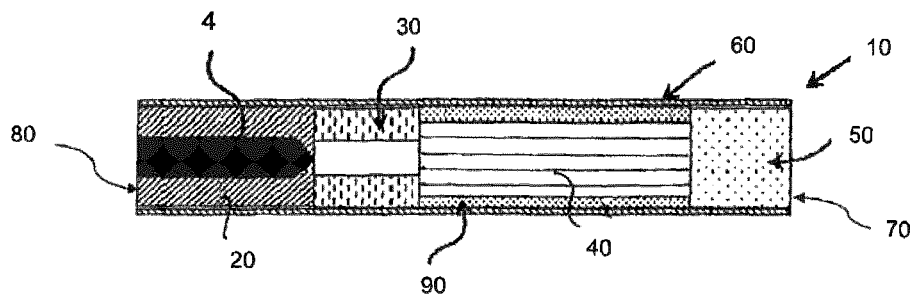
FIG. 3 is a schematic cross-sectional illustration of a specific embodiment of an aerosol-generating article incorporating a susceptor as illustrated in FIGS. 2A and 2B.

FIG. 3 illustrates an aerosol-generating article 10 of an aerosol-generating system according to an embodiment of the present invention. The aerosol-generating article 10 comprises four elements arranged in coaxial alignment: an aerosol-forming substrate 20, a support element 30, an aerosol-cooling element 40, and a mouthpiece 50. Each of these four elements is a substantially cylindrical element, each having substantially the same diameter. These four elements are arranged sequentially and are circumscribed by an outer wrapper 60 to form a cylindrical rod. An elongate bi-layer susceptor 4 is located within the aerosol-forming substrate, in intimate physical contact with the aerosol-forming substrate. The susceptor 4 is the susceptor described above in relation to FIG. 2. The susceptor 4 has a length (12 mm) that is about the same as the length of the aerosol-forming substrate, and is located along a radially central axis of the aerosol-forming substrate.

The aerosol-generating article 10 has a proximal or mouth end 70, which a user inserts into his or her mouth during use, and a distal end 80 located at the opposite end of the aerosol-generating article 10 to the mouth end 70. Once assembled, the total length of the aerosol-generating article 10 is about 45 mm and the diameter is about 7.2 mm.

In use air is drawn through the aerosol-generating article by a user from the distal end 80 to the mouth end 70. The distal end 80 of the aerosol-generating article may also be described as the upstream end of the aerosol-generating article 10 and the mouth end 70 of the aerosol-generating article 10 may also be described as the downstream end of the aerosol-generating article 10. Elements of the aerosol-generating article 10 located between the mouth end 70 and the distal end 80 can be described as being upstream of the mouth end 70 or downstream of the distal end 80.

The aerosol-forming substrate 20 is located at the extreme distal or upstream end 80 of the aerosol-generating article 10. In the embodiment illustrated in FIG. 3, the aerosol-forming substrate 20 comprises a gathered sheet of crimped homogenised tobacco material circumscribed by a wrapper. The crimped sheet of homogenised tobacco material comprises glycerine as an aerosol-former.

The support element 30 is located immediately downstream of the aerosol-forming substrate 20 and abuts the aerosol-forming substrate 20. In the embodiment shown in FIG. 3, the support element is a hollow cellulose acetate tube. The support element 30 locates the aerosol-forming substrate 20 at the extreme distal end 80 of the aerosol-generating article. The support element 30 also acts as a spacer to space the aerosol-cooling element 40 of the aerosol-generating article 10 from the aerosol-forming substrate 20.

The aerosol-cooling element 40 is located immediately downstream of the support element 30 and abuts the support element 30. In use, volatile substances released from the aerosol-forming substrate 20 pass along the aerosol-cooling element 40 towards the mouth end 70 of the aerosol-generating article 10. The volatile substances may cool within the aerosol-cooling element 40 to form an aerosol that is inhaled by the user. In the embodiment illustrated in FIG. 3, the aerosol-cooling element comprises a crimped and gathered sheet of polylactic acid circumscribed by a wrapper 90. The crimped and gathered sheet of polylactic acid defines a plurality of longitudinal channels that extend along the length of the aerosol-cooling element 40.

The mouthpiece 50 is located immediately downstream of the aerosol-cooling element 40 and abuts the aerosol-cooling element 40. In the embodiment illustrated in FIG. 3, the mouthpiece 50 comprises a conventional cellulose acetate tow filter of low filtration efficiency.

To assemble the aerosol-generating article 10, the four cylindrical elements described above are aligned and tightly wrapped within the outer wrapper 60. In the embodiment illustrated in FIG. 3, the outer wrapper is a conventional cigarette paper. The susceptor 4 may be inserted into the aerosol-forming substrate 20 during the process used to form the aerosol-forming substrate, prior to the assembly of the plurality of elements to form a rod.

The specific embodiment described in relation to FIG. 3 comprises an aerosol-forming substrate formed from homogenised tobacco. However, it will be appreciated that in other embodiments the aerosol-forming substrate may be formed from different material. For example, a second specific embodiment of an aerosol-generating article has elements that are identical to those described above in relation to the embodiment of FIG. 3, with the exception that the aerosol-forming substrate 20 is formed from a non-tobacco sheet of cigarette paper that has been soaked in a liquid formulation comprising nicotine pyruvate, glycerine, and water. The cigarette paper absorbs the liquid formulation and the non-tobacco sheet thus comprises nicotine pyruvate, glycerine and water. The ratio of glycerine to nicotine is 5:1. In use, the aerosol-forming substrate 20 is heated to a temperature of about 220 degrees Celsius. At this temperature an aerosol comprising nicotine pyruvate, glycerine, and water is evolved and may be drawn through the filter 50 and into the user's mouth. It is noted that the temperature that the substrate 20 is heated to is considerably lower than the temperature that would be required to evolve an aerosol from a tobacco substrate. As such, in such an embodiment the second susceptor material may be a material having a lower Curie temperature than Nickel. An appropriate Nickel alloy may, for example, be selected.

The aerosol-generating article 10 illustrated in FIG. 3 is designed to engage with an electrically-operated aerosol-generating device comprising an induction coil, or inductor, in order to be consumed by a user.

Figure 4:
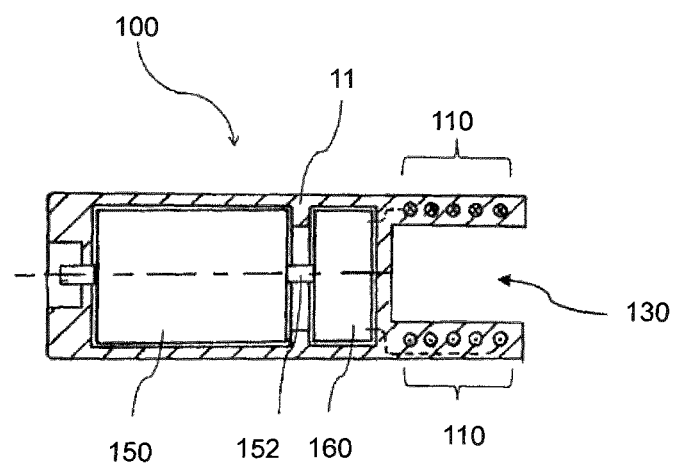
FIG. 4 is a schematic cross-sectional illustration of a specific embodiment of an electrically-operated aerosol-generating device for use with the aerosol-generating article illustrated in FIG. 3.

A schematic cross-sectional illustration of an electrically-operated aerosol-generating device 100 is shown in FIG. 4. The aerosol-generating device 100 is an inductive heating device according to the present invention. The electrically-operated aerosol-generating device 100 comprises a substantially circularly cylindrical housing 11 that substantially contains the components of the device. The aerosol-generating device 100 comprises an inductor 110. As shown in FIG. 4, the inductor 110 is located adjacent a distal portion 131 of a substrate receiving chamber 130 of the aerosol-generating device 100. In use, the user inserts an aerosol-generating article 10 into the substrate receiving chamber 130 of the aerosol-generating device 100 such that the aerosol-forming substrate 20 of the aerosol-generating article 10 is located adjacent to the inductor 110.

The aerosol-generating device 100 comprises a battery 150 and power supply electronics 160 that allow the inductor 110 to be actuated. Such actuation may be manually operated or may occur automatically in response to a user drawing on an aerosol-generating article 10 inserted into the substrate receiving chamber 130 of the aerosol-generating device 100. The battery 150 is a DC power supply, and supplies a DC current and a DC voltage. The power supply electronics 160 include a DC/AC converter or inverter 162 for supplying the inductor 110 with a high frequency AC current, as described in more detail later on. The battery 150 is electrically connected to the power supply electronics through a suitable electrical connection 152.

Figure 5:
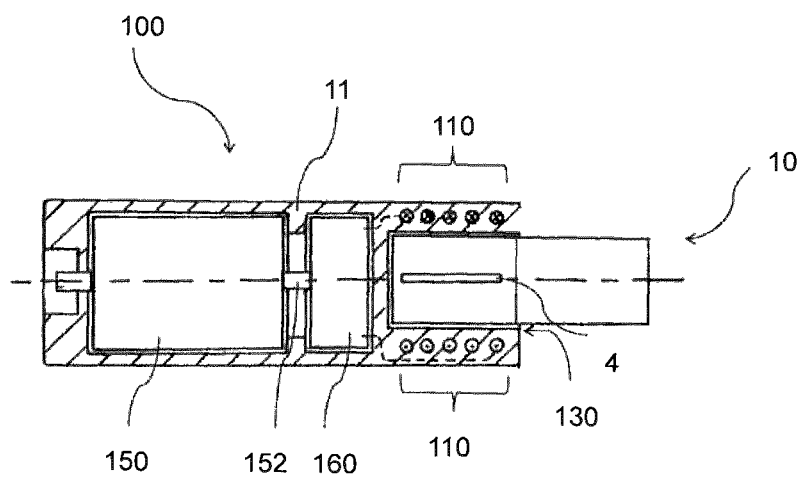
FIG. 5 is a schematic cross-sectional illustration of the aerosol-generating article of FIG. 3 in engagement with the electrically-operated aerosol-generating device of FIG. 4.

FIG. 5 illustrates the aerosol-generating article 10 in engagement with the electrically-operated aerosol-generating device 100. When the device 100 is actuated, a high-frequency alternating current is passed through coils of wire that form part of the inductor 110. This causes the inductor 110 to generate a fluctuating electromagnetic field within the distal portion 131 of the substrate receiving cavity 130 of the device. The electromagnetic field may fluctuate with a frequency of between about 1 MHz and about 30 MHz, between about 2 MHz and about 10 MHz or between about 5 MHz and about 7 MHz. When an aerosol-generating article 10 is correctly located in the substrate receiving cavity 130, the susceptor 4 of the article 10 is located within this fluctuating electromagnetic field. The fluctuating field generates eddy currents within the susceptor, which raises the temperature of the susceptor 4. Further heating is provided by magnetic hysteresis losses within the susceptor 4. Heat is transferred from the heated susceptor 4 to the aerosol-forming substrate 20 of the aerosol-generating article 10 primarily by conduction. The heated susceptor 4 heats the aerosol-forming substrate 20 to a sufficient temperature to form an aerosol. The aerosol is drawn downstream through the aerosol-generating article 10 and is inhaled by the user.

Figure 6:
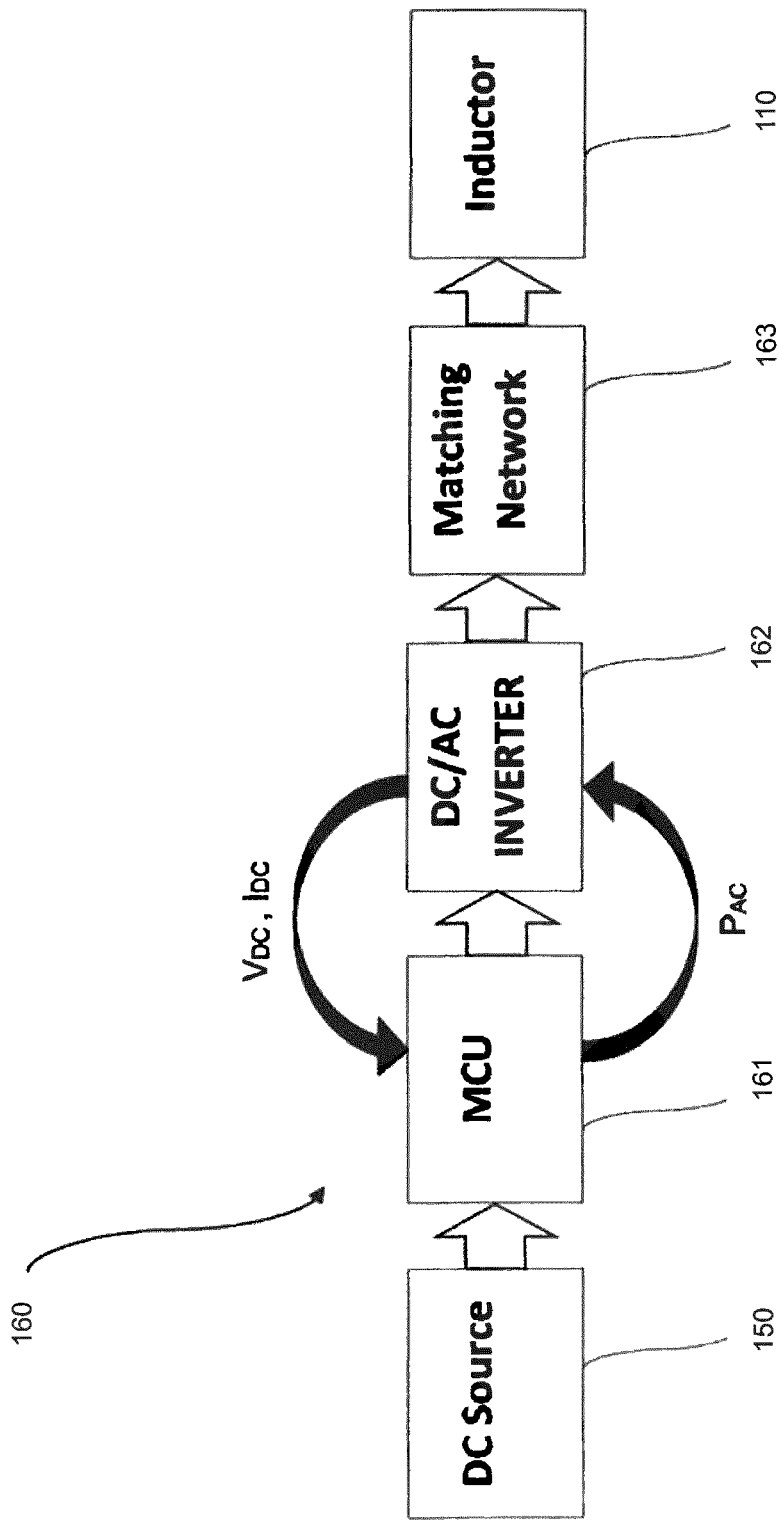
FIG. 6 is a block diagram showing electronic components of the aerosol-generating device described in relation to FIG. 4.

FIG. 6 is a block diagram showing electronic components of the aerosol-generating device 100 described in relation to FIG. 4. The aerosol-generating device 100 comprises the DC power supply 150 (the battery), a microcontroller (microprocessor control unit) 161, a DC/AC converter or inverter 162, a matching network 163 for adaptation to the load, and the inductor 110. The microprocessor control unit 161, DC/AC converter or inverter 162 and matching network 163 are all part of the power supply electronics 160. The DC supply voltage VDC and the DC current IDC drawn from the DC power supply 150 are provided by feed-back channels to the microprocessor control unit 161. This may be by measurement of both the DC supply voltage $V_{DC}$ and the DC current $I_{DC}$ drawn from the DC power supply 150 to control the further supply of AC power $P_{AC}$ to the inductor 110.

It will be appreciated that the matching network 163 may be provided for optimum adaptation of the power supply electronics 160 to the load of the aerosol-generating article 10, but it is not essential. In other embodiments, the electronics may not be provided with a matching network.

Figure 7:
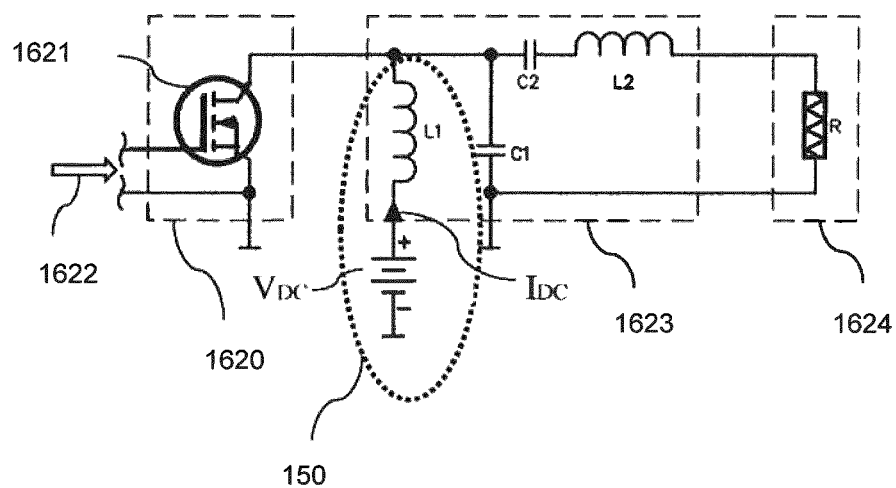
FIG. 7 is a schematic diagram of components of the power electronics of the inductive heating device of FIG. 3.
Figure 8:
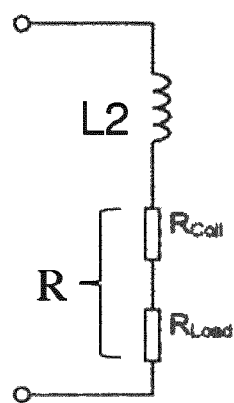
FIG. 8 is a schematic diagram of an inductor of an LC load network of the power electronics of FIG. 7, comprising the inductivity and ohmic resistance of the load.

FIG. 7 shows some components of the power supply electronics 160, more particularly of the DC/AC converter 162. As can be seen from FIG. 7, the DC/AC converter 162 comprises a Class-E power amplifier comprising a transistor switch 1620 comprising a Field Effect Transistor (FET) 1621, for example a Metal-Oxide-Semiconductor Field Effect Transistor (MOSFET), a transistor switch supply circuit indicated by the arrow 1622 for supplying the switching signal (gate-source voltage) to the FET 1621, and an LC load network 1623 comprising a shunt capacitor C1 and a series connection of a capacitor C2 and inductor L2. In addition, the DC power supply 150 comprising a choke L1 is shown for supplying a DC supply voltage $V_{DC}$, with a DC current $I_{DC}$ being drawn from the DC power source 150 during operation. The ohmic resistance R representing the total ohmic load 1624, which is the sum of the ohmic resistance $R_{Coil}$ of the inductor L2 and the ohmic resistance $R_{Load}$ of the susceptor 4, is shown in FIG. 8.

The general operating principle of the Class-E power amplifier are known and are described in detail in the article "Class-E RF Power Amplifiers", Nathan 0. Sokal, published in the bimonthly magazine QEX, edition January/February 2001, pages 9-20, of the American Radio Relay League (ARRL), Newington, Conn., U.S.A. and in WO-A1-2015/177255, WO-A1-2015/177256 and WO-A1-2015/177257 mentioned earlier.

Due to the very low number of components the volume of the power supply electronics 160 can be kept extremely small. For example, the volume of the power supply electronics may be equal or smaller than 2 cm$^3$. This extremely small volume of the power supply electronics is possible due to the inductor L2 of the LC load network 1623 being directly used as the inductor 110 for the inductive coupling to the susceptor 4 of aerosol-forming article, and this small volume allows for keeping the overall dimensions of the entire device 1 small. In embodiments where a separate inductor, other than the inductor L2, is used for the inductive coupling to the susceptor 21, this would necessarily increase the size of the power supply electronics. The size of the power supply electronics is also increased by the provision of a matching network 163.

During operation of the electrically operated aerosol-generating system, the inductor 100 generates a high frequency alternating magnetic field that induces eddy currents in the susceptor 4. As the susceptor 4 of the aerosol-generating article 10 is heated during operation, the apparent resistance ($R_a$) of the susceptor increases as the temperature of the susceptor 110 increases. This increase in the apparent resistance $R_a$ is remotely detected by the power supply electronics 160 through measurements of the DC current $I_{DC}$ drawn from the DC power supply 150, which at constant voltage decreases as the temperature and apparent resistance $R_a$ of the susceptor increases.

Figure 9:
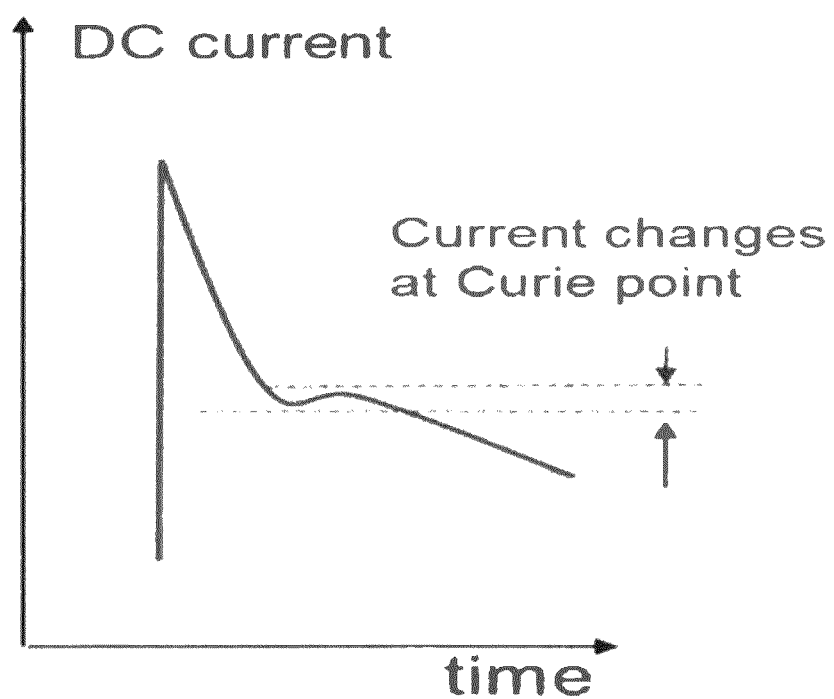
FIG. 9 is a graph of DC current vs. time illustrating the remotely detectable current changes that occur when a susceptor material undergoes a phase transition associated with its Curie point.

The high frequency alternating magnetic field provided by the inductor 110 induces eddy currents in close proximity to the susceptor surface. The resistance in the susceptor depends in part on the electrical resistivities of the first and second susceptor materials and in part on the depth of the skin layer in each material available for induced eddy currents. As the second susceptor material 6 (Nickel) reaches its Curie temperature it loses its magnetic properties. This causes an increase in the skin layer available for eddy currents in the second susceptor material 6, which causes a decrease in the apparent resistance of the susceptor. This results in a temporary increase in the detected DC current $I_{DC}$ drawn from the DC power supply 150 when the second susceptor material reaches its Curie point. This can be seen in the graph of FIG. 9.

Figure 10:
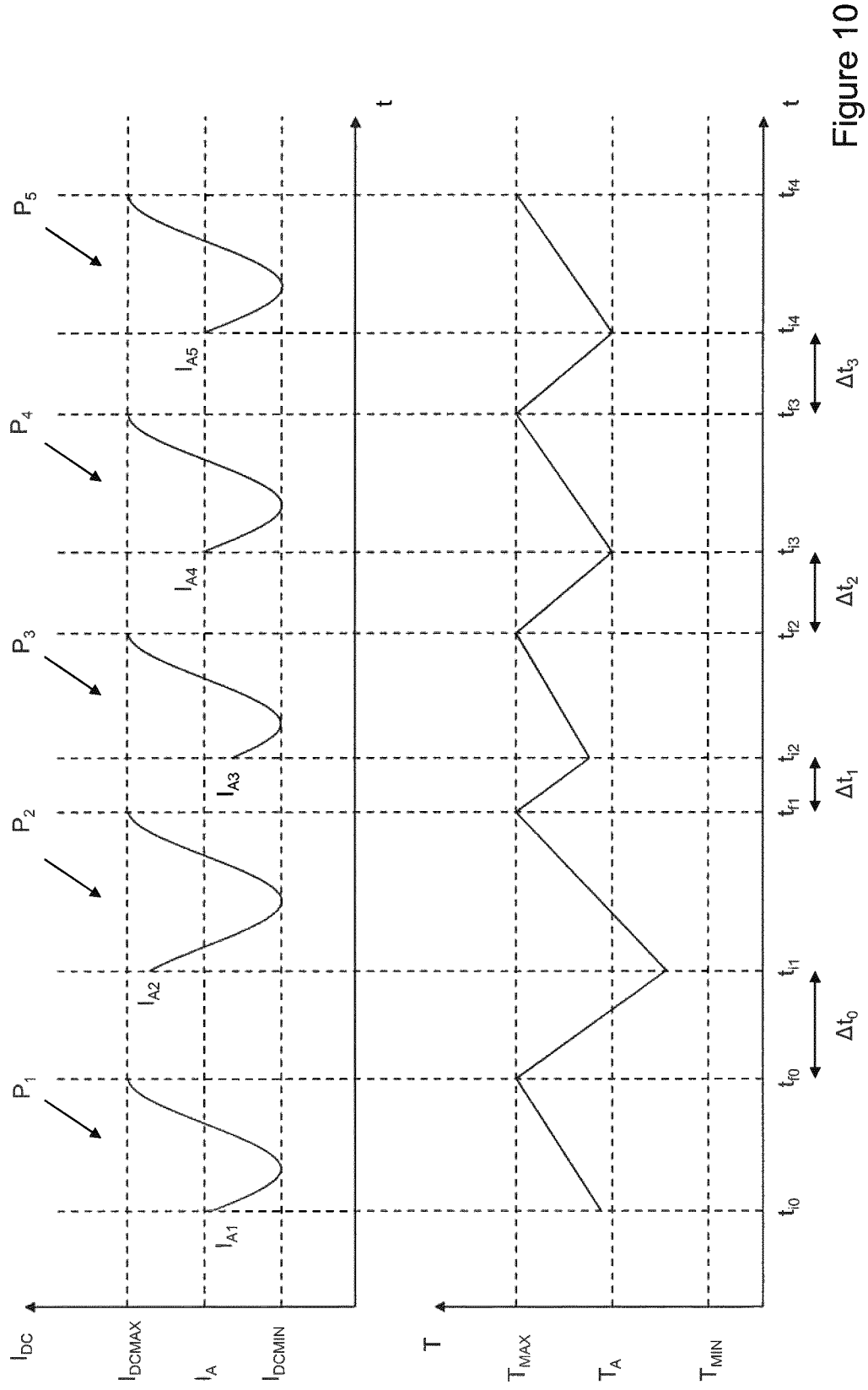
FIG. 10 is a graph of DC current vs. time and susceptor temperature vs. time showing control of the duration of the time period between successive pulses in accordance with the present invention.

FIG. 10 shows a graph of a series of successive pulses of power from the DC power supply 150 to the inductor 110 during operation of the device 1. It can be seen from FIG. 10 that the duration of the pulses and the duration of the time intervals between the pulses are not fixed.

The power supply electronics 160 measure the DC current supplied from the DC power supply 150 to the inductor 110. As shown in FIG. 10, the DC current is indicative of the temperature of the susceptor 4.

The power supply electronics determine the duration of each of the pulses $P_{1-5}$ by detecting a maximum DC current $I_{DCMAX}$ for each pulse. The maximum DC current is indicative of the susceptor 4 being above the second Curie temperature and the phase transition of the second susceptor material having taken place. As such, on detection of the DC power supply 150 supplying the maximum DC current $I_{DCMAX}$, the power supply electronics 160 interrupt the supply of power from the DC power supply 150 to the inductor 110. This avoids overheating of the aerosol-forming substrate in the aerosol-generating article 10 by the susceptor 4.

The power supply electronics 160 determine a minimum DC current $I_{DCMIN}$ supplied by the DC power supply 150 to the inductor 110.

The power supply electronics 160 determine the time interval duration $\Delta t_n$ between the current pulse $P_n$ and the subsequent pulse $P_{n+1}$, on detection of the minimum and maximum DC currents $I_{DCMIN}$, $I_{DCMAX}$. The power supply electronics 160 are configured to calculate the mid-point $I_A$ between the maximum DC current value $I_{DCMAX}$ and the minimum DC current value $I_{DCMIN}$ for each pulse, and compare the mid-point $I_A$ to the initial DC current value $I_{An}$ measured at the start of each pulse. The power supply electronics 160 adjust a reference time interval duration value stored in a memory of the power supply electronics based on the comparison.

On interrupting the power supply from the DC power supply 150 to the inductor 110, the power supply electronics waits for a time period equivalent to the adjusted reference time interval duration. After a time period equivalent to the adjusted reference time interval duration has elapsed, the power supply electronics resumes the supply of power from the DC power supply 150 to the inductor 110 to start the next pulse $P_{n+1}$.

As shown in FIG. 10, the initial DC current value $I_{42}$ for the second pulse $P_2$ is above the mid-point $I_A$ between the maximum DC current $I_{DCMAX}$ and the minimum DC current $I_{DCMIN}$. This is indicative of the temperature of the susceptor being below the mid-point temperature TA between the maximum temperature $T_{MAX}$ and the minimum temperature $T_{MIN}$ at the start of the second pulse $P_2$. Thus, the power supply electronics reduces the duration of the time interval $\Delta t_1$ between the second pulse $P_2$ and the third pulse $P_3$ compared to the time interval to between the first pulse $P_1$ and the second pulse $P_2$. This adjustment provides less time for the susceptor to cool between the second pulse $P_2$ and the third pulse $P_3$.

Similarly, the initial DC current value $I_{43}$ for the third pulse $P_3$ is below the mid-point between the maximum DC current $I_{DCMAX}$ and the minimum DC current $I_{DCMIN}$. This is indicative of the temperature of the susceptor being above the mid-point TA temperature at the start of the third pulse $P_3$. Thus, the power supply electronics reduces the duration of the time interval $\Delta t_2$ between the third pulse $P_3$ and the fourth pulse $P_4$, compared to the time interval $Ot_t$ between the second pulse $P_2$ and the third pulse $P_3$. This adjustment provides more time for the susceptor to cool between the third pulse $P_3$ and the fourth pulse $P_4$.

The initial DC current value $I_{44}$ for the fourth pulse $P_4$ is equal to the mid-point $I_A$ between the maximum DC current $I_{DCMAX}$ and the minimum DC current $I_{DCMIN}$. Thus, the power supply electronics does not adjust the duration of the time interval $\Delta t_4$ between the fourth pulse $P_4$ and the fifth pulse $P_5$, using the same duration as the time interval $\Delta t_3$ between the third pulse $P_3$ and the fourth pulse $P_4$. As such, the duration of the time interval between successive pulses has stabilised after four pulses. Since the duration of the time interval has stabilised, fluctuations in the initial DC current value from the mid-point $I_A$ between the maximum DC current $I_{DCMAX}$ and the minimum DC current $I_{DCMIN}$ for subsequent pulses may indicate a user puffing on the aerosol-generating article.

The exemplary embodiments described above are not intended to limit the scope of the claims. Other embodiments consistent with the exemplary embodiments described above will be apparent to those skilled in the art.

The invention claimed is:

1. An inductive heating device configured to receive an aerosol-generating article comprising an aerosol-forming substrate and a susceptor, and to heat the susceptor when the aerosol-generating article is received by the inductive heating device, the inductive heating device comprising:
   a DC power supply configured to provide a DC supply voltage ($V_{Dc}$) and a DC current ($I_{DC}$); and
   power supply electronics comprising:
      a DC/AC converter connected to the DC power supply, and
      an inductor connected to the DC/AC converter and configured to inductively couple to the susceptor when the aerosol-generating article is received by the inductive heating device,
   wherein the power supply electronics are configured to:
      supply power to the inductor from the DC power supply, via the DC/AC converter, for heating the susceptor when the aerosol-generating article is received by the inductive heating device, the supplied power being provided in a plurality of pulses separated by time intervals,
      control a duration of the time intervals between successive pulses based on measurements of the DC current ($I_{DC}$) provided by the DC power supply, and
      control a duration of a time interval between a first pulse ($P_n$) and a second successive pulse ($P_{n+1}$) based on the DC current ($I_{DC}$) provided by the DC power supply during the first pulse ($P_n$).

2. The inductive heating device according to claim 1, wherein the power supply electronics are further configured to control the duration of the time interval between the first pulse ($P_n$) and the second successive pulse ($P_{n+1}$) based on an initial value of the DC current ($I_{An}$) provided by the DC power supply measured at a start of the first pulse ($P_a$).

3. The inductive heating device according to claim 1,
   wherein the susceptor comprises a first susceptor material and a second susceptor material, the first susceptor material being disposed in thermal proximity to the second susceptor material, and the second susceptor material having a Curie temperature that is lower than 500° C., and
   wherein the power supply electronics are further configured to:
      determine when the DC current ($I_{DC}$) provided by the DC power supply is at a maximum DC current value ($I_{DCMAX}$),
      interrupt the supply of power from the DC power supply to the inductor when the maximum DC current value ($I_{DCMAX}$) is determined, and
      after a determined time interval, resume the supply of power from the DC power supply, such that power is supplied to the inductor from the DC power supply in a plurality of pulses.

4. The inductive heating device according to claim 3, wherein the power supply electronics are further configured to determine when the DC current ($I_{DC}$) provided by the DC power supply is at a minimum DC current value ($I_{DCMIN}$).

5. The inductive heating device according to claim 4, wherein the power supply electronics are further configured to control the duration of the time interval between the first pulse ($P_n$) and the second successive pulse ($P_{n+1}$) based on:
   an initial value of the DC current ($I_{An}$) provided by the DC power supply measured at a start of the first pulse ($P_n$),
   the determined minimum DC current value ($I_{DCMIN}$) of the first pulse ($P_n$), and
   the determined maximum DC current value ($I_{DCMAX}$) of the first pulse ($P_n$).

6. The inductive heating device according to claim 5, wherein the power supply electronics are further configured to:
   determine a mid-point ($I_A$) between the determined minimum DC current value ($I_{DCMIN}$) of the first pulse ($P_n$) and the determined maximum DC current value ($I_{DCMAX}$) of the first pulse ($P_n$),
   compare the initial value of the DC current ($I_{An}$) provided by the DC power supply measured at the start of the first pulse ($P_n$) and the mid-point ($I_A$) between the determined minimum DC current value ($I_{DCMIN}$) of the first pulse ($P_n$) and the maximum DC current value ($I_{DCMAX}$) of the first pulse ($P_n$), and
   determine the time interval between the first pulse ($P_n$) and the second successive pulse ($P_{n+1}$) based on the comparison.

7. The inductive heating device according to claim 1, further comprising:
   a device housing; and
   a cavity arranged in the device housing, the cavity having an internal surface shaped to accommodate at least a portion of the aerosol-forming substrate, the cavity being arranged such that upon accommodation of the portion of the aerosol-forming substrate in the cavity, the inductor is inductively coupled to the susceptor during operation of the device, wherein the power supply electronics are further configured to operate at high frequency, and the DC/AC converter comprising an LC load network configured to operate at low ohmic load, wherein the LC load network comprises a series connection of a capacitor and the inductor having an ohmic resistance, and wherein the power supply electronics comprise a microcontroller programmed to control the power provided from the DC power supply to the inductor.

8. An aerosol-generating system, comprising:
an inductive heating device according to claim 1; and
an aerosol-generating article comprising an aerosol-forming substrate and a susceptor, the inductive heating device being configured to receive the susceptor and to heat the susceptor when the aerosol-generating article is received by the inductive heating device.

9. The aerosol-generating system according to claim 8, wherein the susceptor comprises a first susceptor material and a second susceptor material, the first susceptor material being disposed in intimate physical contact with the second susceptor material, and the second susceptor material having a Curie temperature that is lower than 500° C.

10. A method for operating an inductive heating device according to claim 1, the method comprising:
supplying power to the inductor from the DC power supply via the DC/AC converter for heating the susceptor of the aerosol-generating article when the aerosol-generating article is received by the inductive heating device, the supply of power being provided in a plurality of pulses separated by time intervals; and
controlling a duration of the time intervals between successive pulses based on the DC current ($I_{DC}$) provided by the DC power supply,
wherein the controlling of the duration of the time intervals comprises controlling a time interval duration between a first pulse ($P_n$) and a second successive pulse ($P_{n+1}$) based on an initial value of the DC current ($I_{An}$) provided by the DC power supply measured at a start of the first pulse ($P_n$).

11. The method according to claim 10, wherein the controlling of the duration of the time intervals further comprises:
storing a reference time interval duration value, a maximum DC current value ($I_{DCMAX}$), and a minimum DC current value ($I_{DCMIN}$) on a memory of the power supply electronics,
calculating a mid-point ($I_A$) between the maximum DC current value ($I_{DCMAX}$) and the minimum DC current value ($I_{DCMIN}$),
measuring the DC current ($I_{DC}$) provided by the DC power supply,
comparing the initial value of the DC current ($I_{An}$) measured at the start of the first pulse ($P_n$) to the calculated mid-point ($I_A$),
adjusting the reference time interval duration value based on the comparison, and
controlling the time interval duration between the first pulse ($P_n$) and the second successive pulse ($P_{n+1}$) such that the time interval duration between the first pulse ($P_n$) and the second successive pulse ($P_{n+1}$) is equal to the adjusted reference time interval duration.

12. A method for operating an inductive heating device according to claim 3, the method comprising:
supplying power to the inductor from the DC power supply via the DC/AC converter for heating the susceptor of the aerosol-generating article when the aerosol-generating article is received by the inductive heating device;
measuring the DC current ($I_{DC}$) provided by the DC power supply at a start of the supply of power;
determining an initial value of the DC current ($I_{An}$) provided by the DC power supply at the start of the supply of power to the inductor from the DC power supply;
determining when the DC current ($I_{An}$) provided by the DC power supply is at a minimum DC current value ($I_{DCMIN}$);
determining when the DC current ($I_{An}$) provided by the DC power supply is at a maximum DC current value ($I_{DCMAX}$);
calculating a mid-point ($I_A$) between the determined maximum DC current value ($I_{DCMAX}$) and the determined minimum DC current value ($I_{DCMIN}$);
comparing the determined initial DC current value ($I_{An}$) to the calculated mid-point ($I_A$) between the determined minimum DC current value ($I_{DCMIN}$) and the determined maximum DC current value ($I_{DCMAX}$);
determining a time interval based on the comparison;
interrupting the supply of power from the DC power supply to the inductor when the maximum DC current value ($I_{DCMAX}$) is determined; and
after the determined time interval has elapsed, resuming the supply of power to the inductor from the DC power supply.

13. A control system for an inductive heating device according to claim 1, the control system comprising a microcontroller programmed to perform any of the following method steps comprising:
supplying power to the inductor from the DC power supply via the DC/AC converter for heating the susceptor of the aerosol-generating article when the aerosol-generating article is received by the inductive heating device, the supply of power being provided in a plurality of pulses separated by time intervals; and
controlling a duration of the time intervals between successive pulses based on the DC current ($I_{DC}$) provided by the DC power supply,
wherein the controlling of the duration of the time intervals comprises controlling a time interval duration between a first pulse ($P_n$) and a second successive pulse ($P_{n+1}$) based on an initial value of the DC current ($I_{An}$) provided by the DC power supply measured at a start of the first pulse ($P_n$).

* * * * *